United States Patent
Tsuda et al.

(10) Patent No.: US 10,616,794 B2
(45) Date of Patent: Apr. 7, 2020

(54) WIRELESS COMMUNICATION DEVICE, INFORMATION PROCESSING DEVICE, COMMUNICATION SYSTEM, AND COMMUNICATION QUALITY CALCULATION METHOD AND PROGRAM

(71) Applicant: Sony Corporation, Tokyo (JP)

(72) Inventors: Shinichiro Tsuda, Kanagawa (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 14/413,568

(22) PCT Filed: Apr. 16, 2013

(86) PCT No.: PCT/JP2013/061268
§ 371 (c)(1),
(2) Date: Jan. 8, 2015

(87) PCT Pub. No.: WO2014/013768
PCT Pub. Date: Jan. 23, 2014

(65) Prior Publication Data
US 2015/0156664 A1 Jun. 4, 2015

(30) Foreign Application Priority Data

Jul. 20, 2012 (JP) .................. 2012-161115

(51) Int. Cl.
*H04W 28/02* (2009.01)
*H04W 24/08* (2009.01)
*H04W 36/30* (2009.01)

(52) U.S. Cl.
CPC ....... *H04W 28/0284* (2013.01); *H04W 24/08* (2013.01); *H04W 36/30* (2013.01)

(58) Field of Classification Search
CPC .. H04W 24/08; H04W 28/0284; H04W 36/30
(Continued)

(56) References Cited

U.S. PATENT DOCUMENTS

| 2004/0185868 A1* | 9/2004 | Jain ..................... H04W 52/12 455/453 |
| 2010/0054185 A1* | 3/2010 | Kaneko ................ H04W 24/00 370/328 |

(Continued)

FOREIGN PATENT DOCUMENTS

| CN | 102300262 A | 12/2011 |
| EP | 2400793 A2 | 12/2011 |

(Continued)

OTHER PUBLICATIONS

No Author Listed, 3GPP TS 36.214, 3rd Generation Partnership Project; Technical Specification Group Radio Access Network; Evolved Universal Terrestrial Radio Access (E-UTRA); Physical layer—Measurements, v8.7.0, Sep. 2009, XP-002619832, http://www.3gpp.org/ftp/Specs/html-info/36214.htm [retrieved on Feb. 2, 2011] , 12 pages.

(Continued)

*Primary Examiner* — Jung H Park
(74) *Attorney, Agent, or Firm* — Wolf, Greenfield & Sacks, P.C.

(57) ABSTRACT

A degree of congestion of a wireless communication service is accurately calculated.

A wireless communication device includes a particular signal strength acquiring unit, a received signal strength acquiring unit, and a congestion calculating unit. The particular signal strength acquiring unit acquires a strength of a particular signal that is transmitted from a base station, and is to be referred to at a time of base station selection. The received signal strength acquiring unit acquires a strength of a received signal transmitted in the carrier frequency band from the base station. The congestion calculating unit cal- (Continued)

culates a degree of congestion of the base station by using the strength of the particular signal and the strength of the received signal.

8 Claims, 15 Drawing Sheets

(58) Field of Classification Search
USPC .................................................. 370/252, 331
See application file for complete search history.

(56) References Cited

U.S. PATENT DOCUMENTS

| | | | | |
|---|---|---|---|---|
| 2010/0208603 A1* | 8/2010 | Ishii | .................... | H04B 1/7113 370/252 |
| 2010/0232389 A1* | 9/2010 | Park | ...................... | H04W 36/30 370/331 |
| 2011/0103367 A1* | 5/2011 | Ishii | ...................... | H04L 5/0048 370/350 |
| 2011/0158099 A1* | 6/2011 | Fujita | .................... | H04W 40/12 370/235 |
| 2011/0317583 A1* | 12/2011 | Tsuda | .................... | H04W 28/06 370/253 |
| 2012/0069756 A1* | 3/2012 | Ji | ...................... | H04W 36/0016 370/252 |
| 2012/0106346 A1* | 5/2012 | Aguirre | ................. | H04W 28/08 370/237 |
| 2012/0106383 A1* | 5/2012 | Gormley | ............... | H04L 1/0026 370/252 |
| 2013/0040683 A1* | 2/2013 | Siomina | ............ | H04W 28/0236 455/517 |
| 2013/0044694 A1* | 2/2013 | Aguirre | ................. | H04W 28/16 370/329 |
| 2013/0059585 A1* | 3/2013 | Giloh | ..................... | H04L 45/54 455/436 |
| 2013/0329631 A1* | 12/2013 | Alam | .................. | H04W 52/362 370/328 |
| 2013/0336149 A1* | 12/2013 | Ishii | ...................... | H04W 24/10 370/252 |
| 2013/0344816 A1* | 12/2013 | Niu | ....................... | H04W 48/16 455/67.13 |

FOREIGN PATENT DOCUMENTS

| | | |
|---|---|---|
| JP | 2009-278629 A | 11/2009 |
| JP | 2010-166439 A | 7/2010 |
| JP | 2010-171662 A | 8/2010 |
| JP | 2011-004262 A | 1/2011 |
| JP | 2011-193163 A | 9/2011 |
| JP | 2012-009987 A | 1/2012 |
| JP | 2012-019342 A | 1/2012 |
| JP | 2012-166439 A | 9/2012 |
| WO | WO 2004/025869 A2 | 3/2004 |
| WO | WO 2012/096299 A1 | 7/2012 |

OTHER PUBLICATIONS

No Author Listed, 3GPP TS 36.214, 3rd Generation Partnership Project; Technical Specification Group Radio Access Network; Evolved Universal Terrestrial Radio Access (E-UTRA); Physical layer; Measurements (Release 10), v10.1.0, Mar. 2011, 13 pages.
Chinese Office Action dated Oct. 17, 2017 in connection with Chinese Application No. 201380037429.1 and English translation thereof.
International Search Report and Written Opinion and English translation thereof dated Jul. 9, 2013 in connection with Application No. PCT/JP2013/061268.
International Preliminary Report on Patentability and English translation thereof dated Jan. 29, 2015 in connection with Application No. PCT/JP2013/061268.
Extended European Search Report dated Feb. 18, 2016 in connection with European Application No. 13819785.0.
Japanese Office Action dated May 2, 2017 in connection with Japanese Application No. 2014-525737, and English translation thereof.

* cited by examiner

FIG. 2
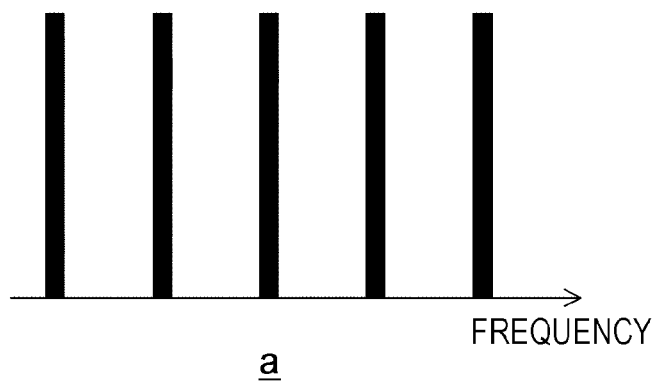
a
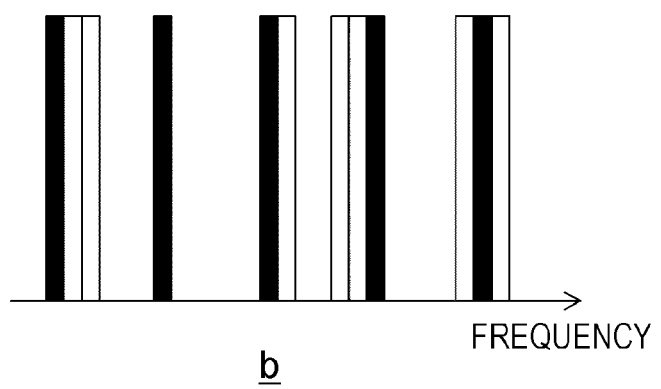
b
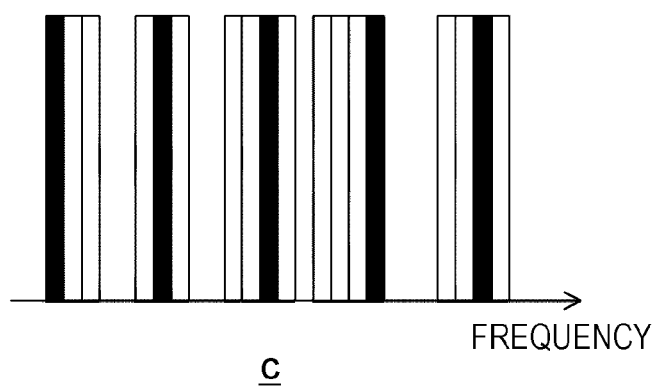
c

FIG. 3

| SNR(dB) | COEFFICIENT |
|---|---|
| −5 TO −4 | 0.0254 |
| −4 TO −2 | 0.0391 |
| −2 TO −0.5 | 0.0628 |
| −0.5 TO 1.5 | 0.1003 |
| 1.5 TO 3.5 | 0.1462 |
| 3.5 TO 5 | 0.1960 |
| 5 TO 7 | 0.2461 |
| 7 TO 9 | 0.3190 |
| 9 TO 11 | 0.4011 |
| 11 TO 12.5 | 0.4551 |
| 12.5 TO 14 | 0.5537 |
| 14 TO 16.5 | 0.6504 |
| 16.5 TO 18 | 0.7539 |
| 18 TO 20 | 0.8525 |
| 20 OR MORE | 0.9258 |

FIG. 5
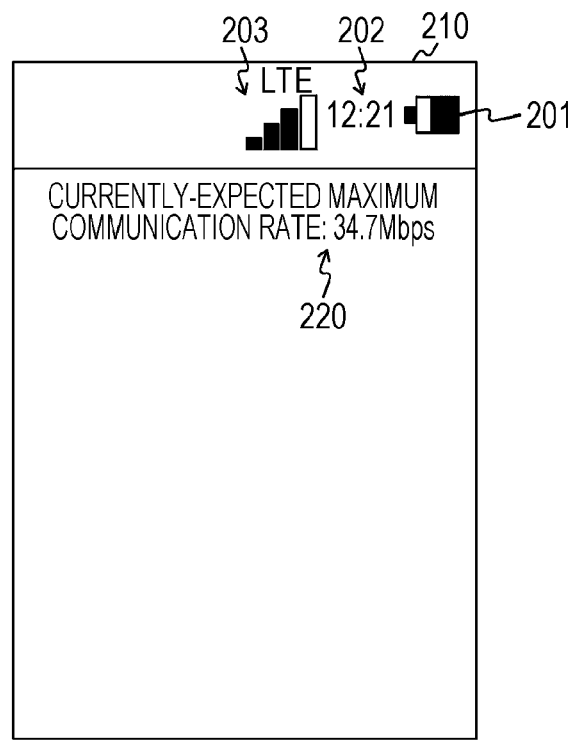
a
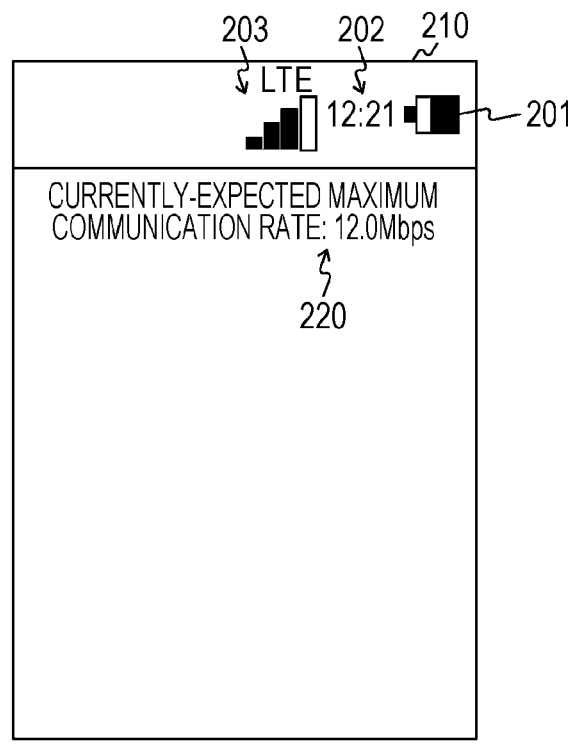
b

FIG. 6
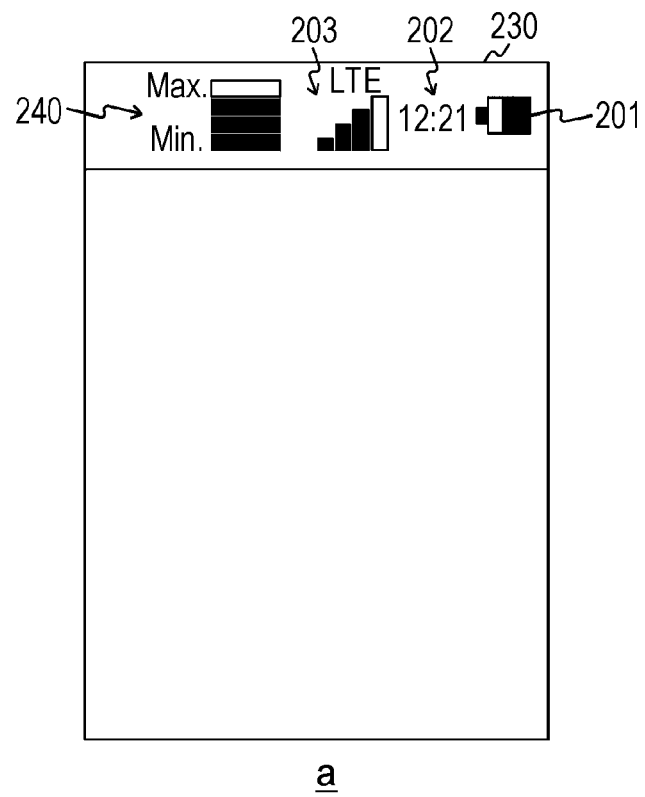
a
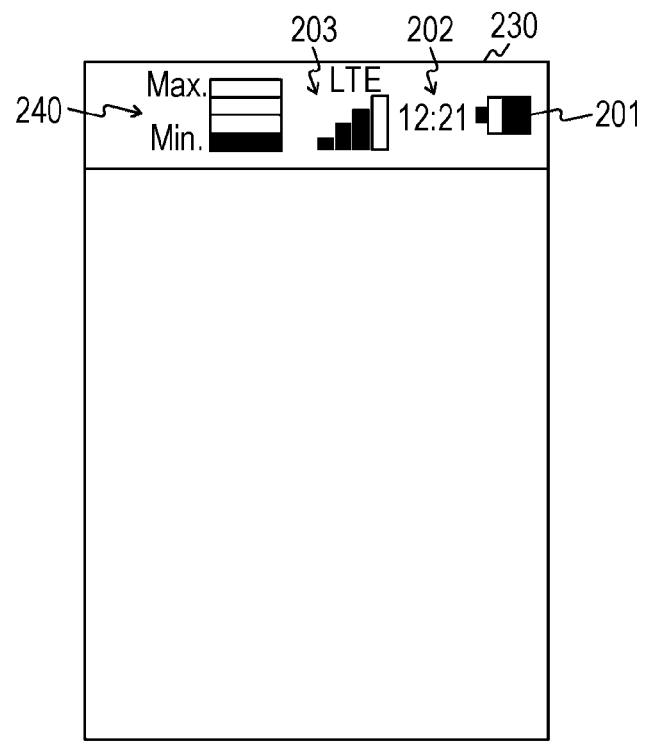
b

FIG. 7
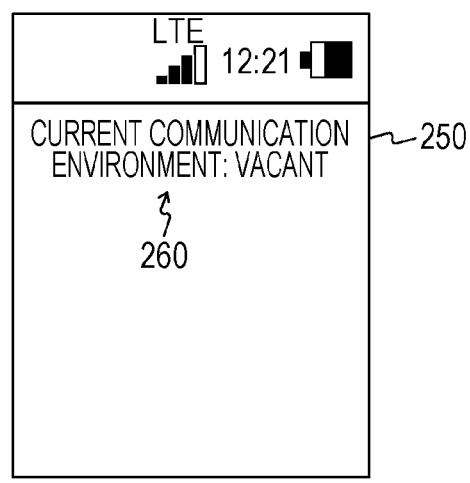
a
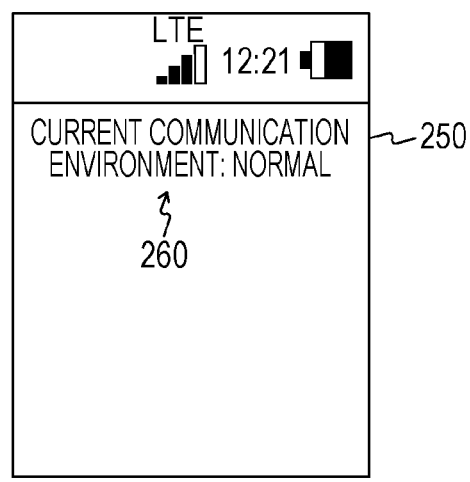
b
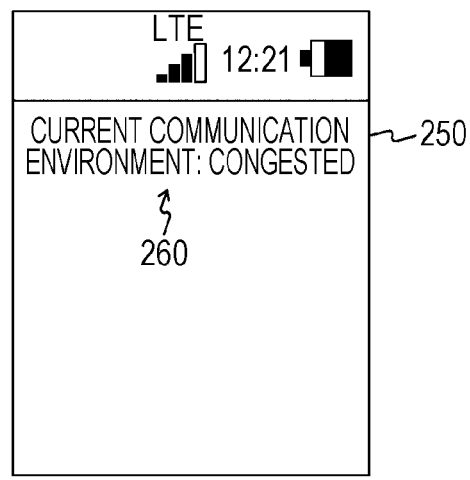
c

FIG. 12

STORAGE UNIT
430

| TIME | LAC | CID | LATITUDE | LONGITUDE | MAXIMUM COMMUNICATION RATE [mbps] | DEGREE OF CONGESTION |
|---|---|---|---|---|---|---|
| 9:00:00 | 6a | 5b0a17c | 35.6772 | 139.6399 | 34.7 | 0.125 |
| 9:01:00 | 6a | 5b0a17e | 35.6731 | 139.6422 | 28.3 | 0.159 |
| ⋮ | ⋮ | ⋮ | ⋮ | ⋮ | ⋮ | ⋮ |
| 17:35:00 | 2dd1 | 8f856a | 35.5855 | 139.5870 | 12.0 | 0.205 |
| 17:36:00 | 2dd1 | 8f8567 | 35.5882 | 139.1593 | 9.2 | 0.257 |
| ⋮ | ⋮ | ⋮ | ⋮ | ⋮ | ⋮ | ⋮ |

431  432  433  434  435  436  437

WIRELESS COMMUNICATION DEVICE, INFORMATION PROCESSING DEVICE, COMMUNICATION SYSTEM, AND COMMUNICATION QUALITY CALCULATION METHOD AND PROGRAM

CROSS-REFERENCE TO RELATED APPLICATIONS

This application claims the benefit under 35 U.S.C. § 371 as a U.S. National Stage Entry of International Application No. PCT/JP2013/061268, filed in the Japanese Patent Office as a Receiving Office on Apr. 16, 2013, which claims priority to Japanese Patent Application Number JP2012-161115, filed in the Japanese Patent Office on Jul. 20, 2012, each of which is hereby incorporated by reference in its entirety.

TECHNICAL FIELD

The present technique relates to wireless communication devices. More particularly, the present technique relates to a wireless communication device that performs processes related to wireless communication, an information processing device, a communication system, a communication quality calculation method, and a program for causing a computer to implement the method.

BACKGROUND ART

Wireless communication devices connected to a network such as a public wireless network have been widely spread. In 2002, a 3G (3rd-Generation) portable telephone service (called "3G" in Japan) was started. At first, this portable telephone service was an application that mainly involved small-capacity packets of sound, text, and the like. However, after HSDPA (High Speed Downlink Packet Access) and the like were introduced, the users' patterns of use have been changing to downloading of packets with relatively large sizes, such as downloading of music files and viewing of videos.

For example, there might be cases where users concentrate on a certain area and conduct downloading of large-capacity packets. In such cases, traffic locally concentrates, and a sufficient rate might not be obtained. Therefore, it is essential to closely follow the state of a wireless channel that changes with every moment.

For example, there is a suggested wireless communication device that calculates a degree of congestion of a wireless communication service based on a result of reception of a radio signal received from a base station providing the wireless communication service (see Patent Document 1, for example).

CITATION LIST

Patent Document

Patent Document 1: Japanese Patent Application Laid-Open No. 2012-9987

SUMMARY OF THE INVENTION

Problems to be Solved by the Invention

In the above mentioned conventional technique, an effective communication rate of a wireless communication service can be estimated by using a calculated degree of congestion.

In recent years, communication services that use OFDMA (Orthogonal Frequency Division Multiple Access) have started so as to cope with the rapid increase in traffic. These communication services include LTE (Long Term Evolution), for example. As described above, in a communication service that newly starts, it is also essential to closely follow the state of a wireless channel that changes with every moment by accurately calculating a degree of congestion of the wireless communication service.

The present technique has been developed in view of the above circumstances, and aims to accurately calculate a degree of congestion of a wireless communication service.

Solutions to Problems

The present technique has been developed to solve the above described problems, and a first aspect thereof lies in a wireless communication device that includes: a particular signal strength acquiring unit that acquires a strength of a particular signal transmitted from a base station, the particular signal being to be referred to as a time of base station selection; a received signal strength acquiring unit that acquires a strength of a received signal transmitted in the carrier frequency band from the base station; and a congestion calculating unit that calculates a degree of congestion of the base station by using the strength of the particular signal and the strength of the received signal, a communication quality calculation method for the wireless communication device, and a program for causing a computer to implement the communication quality calculation method. With this structure, the degree of congestion of the base station is calculated by using the strength of the particular signal and the strength of the received signal.

In the first aspect, the wireless communication device may further include: a signal-to-noise ratio acquiring unit that acquires a ratio between the signal strength of the particular signal and a noise component; and a maximum communication rate calculating unit that calculates a maximum communication rate of a communication service provided by the base station. With this structure, the maximum communication rate of the communication service provided by the base station is calculated by using the ratio between the signal strength of the particular signal and the noise component.

In the first aspect, the wireless communication device may further include a communication rate calculating unit that calculates an effective communication rate by using the calculated maximum communication rate and the calculated degree of congestion of the base station, the effective communication rate being a communication rate effective in the communication service provided by the base station. With this structure, the effective communication rate is calculated by using the maximum communication rate and the degree of congestion of the base station.

In the first aspect, the wireless communication device may further include a display unit that displays at least one of the calculated maximum communication rate, the calculated degree of congestion of the base station, and the calculated effective communication rate. With this structure, at least one of the maximum communication rate, the degree of congestion of the base station, and the effective communication rate is displayed.

In the first aspect, the wireless communication device may further include: a positional information acquiring unit that acquires positional information for identifying a position where the wireless communication device is located; and a control unit that performs control to associate at least one of the strength of the particular signal, the strength of the received signal, the ratio, the degree of congestion of the base station, and the maximum communication rate with the acquired positional information, and transmit the at least one piece of information associated with the positional information to an information processing device that manages information related to wireless communication. With this structure, at least one of the strength of the particular signal, the strength of the received signal, the ratio between the signal strength of the particular signal and the component noise, the degree of congestion of the base station, and the maximum communication rate is associated with the acquired positional information, and is transmitted to an information processing device.

In the first aspect, the wireless communication device may further include: a determining unit that determines communication quality by using at least one of the strength of the particular signal, the strength of the received signal, the ratio, the degree of congestion of the base station, the maximum communication rate, and the effective communication rate; and a switch control unit that switches connection rights for the wireless communication device to connect to a base station by using wireless communication based on a result of the determination made by the determining unit. With this structure, communication quality is determined, and connection rights are switched based on the result of the determination.

In the first aspect, the switch control unit may change at least one of settings with respect to a carrier frequency and a wireless communication method at a wireless communication unit in accordance with the connection right switching, the wireless communication unit performing wireless communication with the base station. With this structure, at least one of the settings with respect to the carrier frequency and the wireless communication method at the wireless communication unit is changed in accordance with the connection right switching.

In the first aspect, the particular signal may be a signal transmitted from the base station to the wireless communication device to perform at least one of estimation of communication quality of a channel, cell selection, cell re-selection, and handover determination, the particular signal being one of a beacon signal, a pilot signal, and a reference signal. With this structure, the degree of congestion of the base station is calculated by using a beacon signal, a pilot signal, or a reference signal as the particular signal.

A second aspect of the present technique lies in an information processing device that include: an acquiring unit that acquires, from a wireless communication device, a strength of a particular signal transmitted from a base station and a strength of a received signal transmitted in a carrier frequency band from the base station, the particular signal being to be referred to at a time of base station selection; and a congestion calculating unit that calculates a degree of congestion of the base station by using the strength of the particular signal and the strength of the received signal, the wireless communication device being connected to the base station, a communication quality calculation method for the information processing device, and a program for causing a computer to implement the communication quality calculation method. With this structure, the strength of the particular signal and the strength of the received signal are acquired from the wireless communication device, and the degree of congestion of the base station is calculated by using the strength of the particular signal and the strength of the received signal.

A third aspect of the present technique lies in a communication system that includes: a wireless communication device including: a congestion calculating unit that calculates a degree of congestion of a base station by using a strength of a particular signal transmitted from the base station and a strength of a received signal transmitted in a carrier frequency band from the base station, the particular signal being to be referred to at a time of base station selection; and a control unit that performs control to transmit, to an information processing device, communication quality information in which positional information for identifying a position where the wireless communication device is located is associated with at least one of the strength of the particular signal, the strength of the received signal, and the degree of congestion of the base station; and the information processing device that manages the communication quality information transmitted from the wireless communication device, and provides the communication quality information in accordance with a request from the wireless communication device, a communication quality calculation method for the communication system, and a program for causing a computer to implement the communication quality calculation method. With this structure, the wireless communication device calculates the degree of congestion of the base station by using the strength of the particular signal and the strength of the received signal, and transmits, to the information processing device, the communication quality information in which at least one of the strength of the particular signal, the strength of the received signal, and the degree of congestion of the base station is associated with the positional information. The information processing device manages the communication quality information transmitted from the wireless communication device, and provides the communication quality information in accordance with a request from the wireless communication device.

Effects of the Invention

According to the present technique, an excellent effect to accurately calculate a degree of congestion of a wireless communication service can be achieved.

BRIEF DESCRIPTION OF DRAWINGS

FIGS. 2a to 2c are diagrams schematically showing a relationship between reference signals allocated to a subframe and resource blocks allocated to a wireless communication device.

FIG. 3 is a diagram showing an example of the table that a serving cell maximum communication rate calculating unit 160 in the first embodiment of the present technique uses in calculating a maximum communication rate.

FIGS. 5a and 5b are diagrams showing an example of display (a display screen 210) of a maximum communication rate calculated by the serving cell maximum communication rate calculating unit 160 in the first embodiment of the present technique.

FIGS. 6a and 6b are diagrams showing an example of display (a display screen 230) of a maximum communication rate calculated by the serving cell maximum communication rate calculating unit 160 in the first embodiment of the present technique.

FIGS. 7a to 7c are diagrams showing an example of display (a display screen 250) of a degree of congestion calculated by a serving cell congestion calculating unit 140 in the first embodiment of the present technique.

FIG. 12 is a diagram schematically showing an example of the contents of a storage unit 430 of the wireless communication device 400 in the third embodiment of the present technique.

MODES FOR CARRYING OUT THE INVENTION

The following is a description of modes (hereinafter referred to as embodiments) for carrying out the present technique. Explanation will be made in the following order.

1. First embodiment (Communication quality calculation control: an example of communication quality calculation using signals transmitted from base stations)

2. Second embodiment (Subscription authentication information switch control: an example of switching of subscription authentication information based on communication quality)

3. Third embodiment (Communication quality management control: an example of an information processing device managing communication quality calculated in a wireless communication device)

<1. First Embodiment>

[Example Structure of a Wireless Communication Device]

Figure 1:
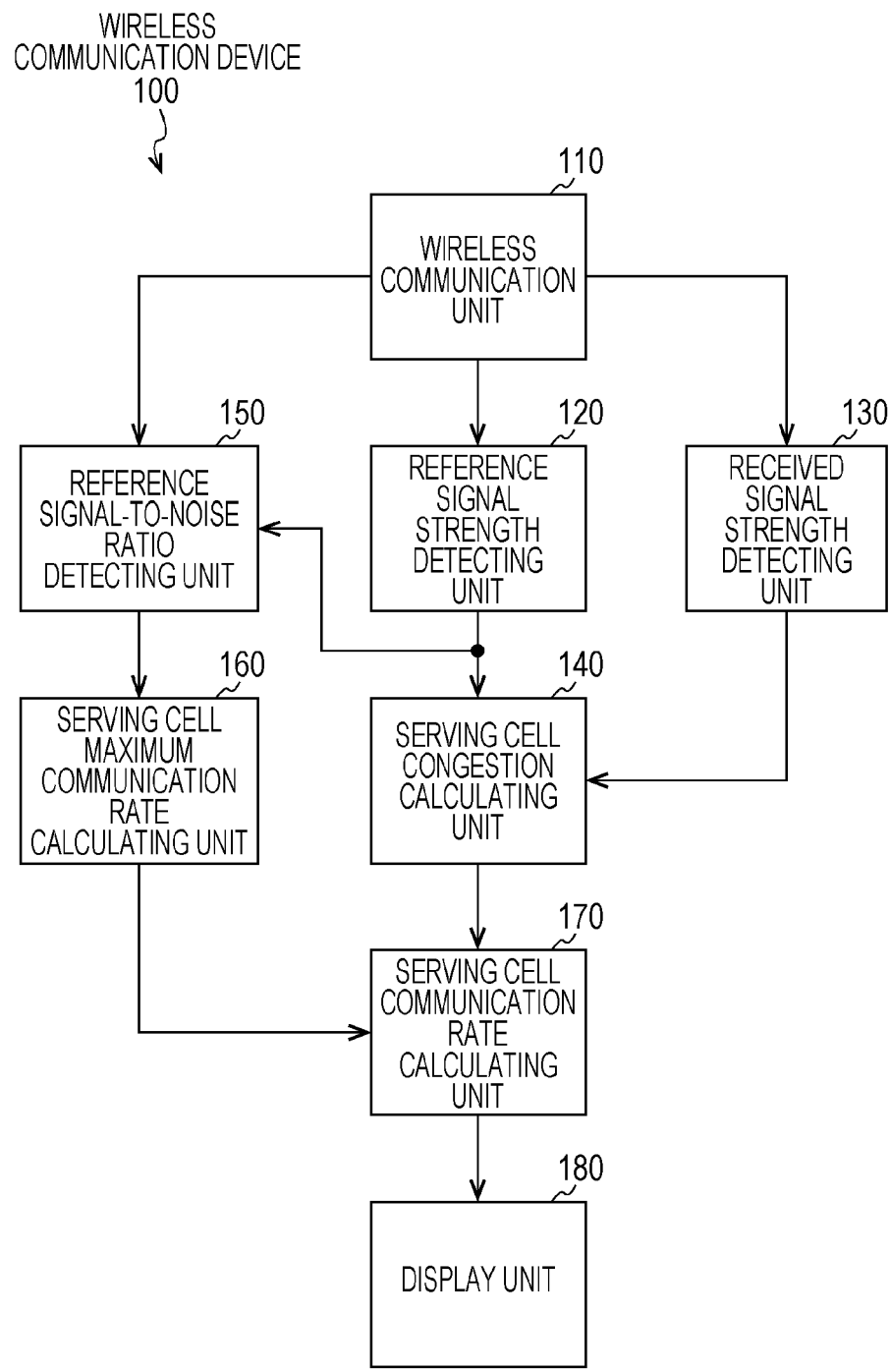
FIG. 1 is a block diagram showing an example functional structure of a wireless communication device 100 in a first embodiment of the present technique.

FIG. 1 is a block diagram showing an example functional structure of a wireless communication device 100 according to a first embodiment of the present technique.

The wireless communication device 100 includes a wireless communication unit 110, a reference signal strength detecting unit 120, a received signal strength detecting unit 130, a serving cell congestion calculating unit 140, and a reference signal-to-noise ratio detecting unit 150. The wireless communication device 100 also includes a serving cell maximum communication rate calculating unit 160, a serving cell communication rate calculating unit 170, and a display unit 180. The wireless communication device 100 is a portable telephone device (such as a portable telephone device or a smartphone having a verbal communication function and a data communication function, for example), a data communication device (such as a personal computer) having a wireless communication function, or the like.

The wireless communication unit 110 transmits and receives respective pieces of information (such as audio data and image data) to and from base stations that provide communication services (base stations operated by a telecommunications operator), and supplies received information to the respective components. For example, the wireless communication unit 110 performs wireless communication using a 3G network based on subscription authentication information stored in the wireless communication device 100 (valid subscription authentication information).

Here, the subscription authentication information is information necessary for connecting to a wireless communication network managed by the telecommunications operator, and includes subscription information related to authentication and billing, and the like. The subscription authentication information also includes telephone subscriber information and authentication key information, for example. The subscription authentication information is a USIM (Universal Subscriber Identity Module), for example.

In a case where valid subscription authentication information is set in the wireless communication device 100, for example, it can be considered that a connection right (a rewritable connection right) to connect to a predetermined network (such as a public network) using wireless communication is set therein. That is, the connection right is the right to connect to a base station based on the subscription authentication information related to the telecommunications operator that operates the base station.

For example, the user who owns the wireless communication device 100 signs up with a first telecommunications operator for a wireless connection service, and sets valid subscription authentication information related to the first telecommunications operator in the wireless communication device 100, so that the user can use the base stations operated by the first telecommunications operator. Likewise, the user who owns the wireless communication device 100 signs up with a second telecommunications operator for a wireless connection service, and sets valid subscription authentication information related to the second telecommunications operator in the wireless communication device 100, so that the user can use the base stations operated by the second telecommunications operator.

In the embodiments of the present technique, a USIM is used as the subscription authentication information. However, the present technique is not limited to that, and some other subscription authentication information may be used. For example, it is possible to use a SIM that can be downloaded in terms of software (such as a software downloadable SIM (Subscriber Identity Module)). The SIM that can be downloaded in terms of software may be a MCIM (Machine Communication Identity Module), for example. Alternatively, a rewritable SIM may be used.

In the embodiments of the present technique, the term "base station" means both a base station and the cell identified by the base station. In the embodiments of the present technique, a subscription using a base station also means a subscription using the cell identified by the base station, for example.

The reference signal strength detecting unit 120 detects the strength of a reference signal included in information supplied from the wireless communication unit 110, and outputs the detected reference signal strength to the serving cell congestion calculating unit 140. For example, after establishing synchronization with a base station, the reference signal strength detecting unit 120 acquires a reference signal transmitted from the base station, and detects the strength thereof. That is, the reference signal strength detecting unit 120 acquires the strength of a reference signal (the particular signal) that is transmitted from a base station and is to be referred to at a time of base station selection. Here, the wireless communication device 100 selects a serving cell that is the base station that has transmitted the reference signal with the highest strength among the reference signals that have been transmitted from base stations and been received by the wireless communication unit 110. The serving cell is the cell (base station) to which the wireless communication device is connected through wireless communication, or the cell that is identified by a cell search and is to be connected to. That is, the serving cell is the cell (base station) to be connected to. The reference signal strength detecting unit 120 is an example of the particular signal strength acquiring unit in the claims.

A reference signal is a signal transmitted from a base station, and is an example of the particular signal to be referred to at a time of base station selection. A reference signal is also a signal that is transmitted from a base station to the wireless communication device 100 to perform at least one of the following processes: channel communication quality estimation, cell selection, cell re-selection, and handover determination, for example.

The received signal strength detecting unit 130 detects the strength of a received signal included in information supplied from the wireless communication unit 110, and outputs the detected strength of the received signal to the serving cell congestion calculating unit 140. For example, the received signal strength detecting unit 130 detects the strength of a received signal in the carrier frequency band being used by the communication service being provided (or a received signal transmitted in the carrier frequency band from the base station). The received signal strength is normally used for displaying antenna bars (the indicator in an antenna bar display region 203 shown in FIG. 4, for example). The received signal strength detecting unit 130 is an example of the received signal strength acquiring unit in the claims.

The serving cell congestion calculating unit 140 calculates a degree of congestion based on the reference signal strength output from the reference signal strength detecting unit 120 and the received signal strength output from the received signal strength detecting unit 130 (the strength of the received signal within the carrier frequency band). As this degree of congestion, the degree of congestion of each frame in the serving cell is calculated, for example. The serving cell congestion calculating unit 140 then outputs the calculated degree of congestion of each frame in the serving cell to the serving cell communication rate calculating unit 170.

In a case where the communication service is LTE (Long Term Evolution), for example, the received reference signal strength is constant if the wireless communication device 100 is fixed to a certain spot without any external influence.

If signals of the respective frames from the base stations are transmitted after information is allocated to a large number of subcarriers of the orthogonal frequency division multiple access system, the strength of the received signal in the carrier frequency band becomes higher. If these signals are transmitted after information is allocated to a small number of subcarriers, the strength of the received signal in the carrier frequency band becomes lower. In view of this, the degree of congestion of the serving cell can be detected from a ratio between the reference signal strength and the strength of the received signal in the carrier frequency band.

In a case where RSRQ (Reference Signal Received Quality) can be acquired, the value of RSRQ may be used in calculating the degree of congestion. An example of calculation of this degree of congestion kcong is shown in Mathematical Formula 2.

[Example of a Relationship Between Resource Blocks and Reference Signals]

Referring now to FIGS. 2a to 2c, a relationship between resource blocks and reference signals is described.

FIGS. 2a to 2c are diagrams schematically showing a relationship between reference signals allocated to a sub-frame and resource blocks allocated to a wireless communication device. In FIGS. 2a to 2c, each group of one solid black rectangle and one or more white rectangles represents a resource block. Each solid black rectangle represents a reference signal.

In FIG. 2a, only reference signals are transmitted. That is, FIG. 2a shows resource blocks allocated to reference signals. In FIG. 2b, resource blocks are allocated for transmitting data to one or more wireless communication devices. In FIG. 2c, more resource blocks than those in FIG. 2b are allocated to one or more wireless communication devices.

As shown in FIGS. 2a to 2c, the base station can be considered to be more congested in the state shown in FIG. 2b than in the state shown in FIG. 2a. Likewise, the base station can be considered to be more congested in the state shown in FIG. 2c than in the state shown in FIG. 2b. That is, the base station is considered to be more congested where the ratio of the reference signal power to the power of all the resource blocks is lower as the average power in each sub-frame or in any sub-frame.

[Example of Calculation of a Degree of Congestion]

Here, the average power of reference signals is represented by an RSRP (Reference Signal Received Power), and all the received power is represented by an RSSI (Received Signal Strength Indicator). The RSRP is detected by the reference signal strength detecting unit 120, and the RSSI is detected by the received signal strength detecting unit 130. In this case, RSRQ (Reference Signal Received Quality) is defined in Mathematical Formula 1 shown below.

$$RSRQ = N \cdot (RSRP/RSSI) \qquad \text{Mathematical Formula 1}$$

Here, N represents the number of resource blocks within the RSSI measurement band.

Where the minimum value of RSRQ is represented by a, for example, the degree of congestion kcong can be calculated according to Mathematical Formula 2 shown below.

$$kcong = a/(RSRQ) \qquad \text{Mathematical Formula 2}$$

As specified in Table 9.1.7-1 of 3GPP TS 36.133, RSRQ is mapped in the 34 patterns of RSRQ_00 to RSRQ_33 at intervals of 0.5 dB. The RSRQ in the state where the base station or traffic is the most congested is RSRQ_00. In view of this, the minimum value a of RSRQ in Mathematical Formula 2 can be set as −19.5 dB. However, a is preferably an antilogarithm.

In a case where the degree of congestion kcong is calculated by using the index values of RSRQ_00 through RSRQ_33 specified in Table 9.1.7-1 of 3GPP TS 36.133, Mathematical Formula 2 can be transformed into Mathematical Formula 3 shown below.

$$kcong = 10^{\{(RSRQ\_00 - RSRQ\_XX)/(2 \times 10)\}} \qquad \text{Mathematical Formula 3}$$

Here, XX represents the index value 00, 01, . . . , or 33. In a case where RSRQ is not handled in terms of electric power as in Mathematical Formula 2 but is handled in terms of voltage, Mathematical Formula 2 may be transformed into Mathematical Formula 4 shown below.

$$kcong=\sqrt{(a/\text{RSCQ})} \quad \text{Mathematical Formula 4}$$

The calculation of the degree of congestion kcong is not limited to Mathematical Formulas 2 through 4, and various changes may be made to them without departing from the scope or spirit of the present technique.

As described above, a degree of congestion indicates a proportion of vacant available resource blocks to all the available resource blocks. Also, in the embodiments of the present technique, a state where the number of vacant resource blocks is small is defined as a state with a "high degree of congestion", and a state where the number of vacant resource blocks is large is defined as a state with a "low degree of congestion".

Also, a state where the number of vacant resource blocks becomes equivalently smaller in accordance with an interference component from a base station in the surrounding area, thermal noise, or a noise component generated in the reception circuit, may be regarded as a state with a "high degree of congestion".

Although an example of calculation of a degree of congestion of the orthogonal frequency division multiple access system has been described, a degree of congestion of the code division multiplexing system can also be calculated. That is, a degree of congestion of the code division multiplexing system can be calculated by substituting resource blocks of the orthogonal frequency division multiple access system with orthogonal codes of the code division multiplexing system.

[Example Structure of a Wireless Communication Device]

The reference signal-to-noise ratio detecting unit 150 shown in FIG. 1 detects a ratio between the reference signal strength output from the reference signal strength detecting unit 120 and the noise component (noise power, for example) thereof. For example, an SNR (Signal to Noise Ratio) is detected. The reference signal-to-noise ratio detecting unit 150 then outputs the value of the detected ratio (the ratio of the signal strength of a reference signal to noise) to the serving cell maximum communication rate calculating unit 160.

For example, the reference signal-to-noise ratio detecting unit 150 can detect a noise component generated in the circuit (the reference signal strength detecting unit 120) that detects the strength of a reference signal. The reference signal-to-noise ratio detecting unit 150 can also detect a noise component that is amplified thermal noise, or a noise component that is an interference component from an adjacent base station (an adjacent cell). As described above, noise components include not only thermal noise and internal noise generated in the transmission and reception circuits, but also interference components and the like from neighborhood base stations. The reference signal-to-noise ratio detecting unit 150 is an example of the signal-to-noise ratio acquiring unit in the claims.

The serving cell maximum communication rate calculating unit 160 calculates the maximum communication rate to be expected in a case where the serving cell is used, and outputs the calculated maximum communication rate to the serving cell communication rate calculating unit 170.

Here, adaptive modulation and coding, which is called HSDPA in the third-generation mobile communication system or AMC (Adaptive Modulation and Coding) in LTE and LTE-Advanced, is performed. The modulation method and the coded rate are then optimized in accordance with the characteristics of propagation between the base station and the wireless communication device.

In accordance with the ratio of the reference signal strength to noise detected by the reference signal-to-noise ratio detecting unit 150, the serving cell maximum communication rate calculating unit 160 can calculate the maximum communication rate to be expected in a case where the serving cell is used. The serving cell maximum communication rate calculating unit 160 may perform the maximum communication rate calculation only when the wireless communication device 100 is in a standby state. The serving cell maximum communication rate calculating unit 160 is an example of the maximum communication rate calculating unit in the claims.

[Example of the Table Used in Calculating the Maximum Communication Rate]

FIG. 3 is a diagram showing an example of the table that the serving cell maximum communication rate calculating unit 160 in the first embodiment of the present technique uses in calculating the maximum communication rate. FIG. 3 shows the relationship between SNRs detected by the reference signal-to-noise ratio detecting unit 150 and coefficients to be used in the maximum communication rate calculation.

Here, the maximum communication rate of a communication service that the wireless communication device 100 can receive is represented by MCR1, and the coefficient corresponding to the SNR detected by the reference signal-to-noise ratio detecting unit 150 is represented by C1. In this case, the serving cell maximum communication rate calculating unit 160 can output an expected maximum communication rate Rmax by performing a calculation using Mathematical Formula 5 shown below.

$$R\text{max}=\text{MCR1}\times C1 \quad \text{Mathematical Formula 5}$$

For example, the maximum communication rate of a communication service that the wireless communication device 100 can receive is 37.5 Mbps, and the SNR detected by the reference signal-to-noise ratio detecting unit 150 is 17 dB. According to the table shown in FIG. 3, the coefficient C1 corresponding to the SNR (17 dB) is 0.7539 in this case. The serving cell maximum communication rate calculating unit 160 then performs a calculation using Mathematical Formula 5 (37.5×0.7539=28.27 Mbps), and outputs 28.27 Mbps as an expected maximum communication rate.

The coefficients in the table shown in FIG. 3 were calculated by using the CQI (Channel Quality Indicator) table in the 3GPP specification (3GPP TS 36.213). Specifically, the coefficients were calculated by normalizing the numbers of information bits per symbol corresponding to the respective CQI values in the CQI table in the 3GPP specification (3GPP TS 36.213) with "6", which is the number of information bits that can be transmitted by 64-QAM.

In a case where 128-QAM or a higher-order modulation scheme is used, for example, the coefficients in the table shown in FIG. 3 are normalized with the number of information bits that can be transmitted by the modulation scheme with the largest number of digits.

In a case where the wireless communication unit 110 outputs CQI indexes or DRC (Data Rate Control) indexes, the CQI indexes or the DRC indexes may be used, instead of SNRs.

[Example Structure of a Wireless Communication Device]

Based on the value of the expected maximum communication rate and the degree of congestion of the serving cell, the serving cell communication rate calculating unit 170 shown in FIG. 1 calculates the value of a communication rate (an effective communication rate) that is effective in the communication service being provided by a base station. The serving cell communication rate calculating unit 170 then causes the display unit 180 to display the result of the calculation. Specifically, the serving cell communication rate calculating unit 170 uses the maximum communication rate Rmax calculated by the serving cell maximum communication rate calculating unit 160 and the degree of congestion kcong calculated by the serving cell congestion calculating unit 140. The serving cell communication rate calculating unit 170 then calculates an effective communication rate Reff. The effective communication rate Reff calculated in this manner can be recognized as a predicted communication rate of the serving cell.

If the serving cell is congested at this point, the serving cell communication rate calculating unit 170 performs such a calculation that the effective communication rate Reff becomes smaller with respect to the expected maximum communication rate Rmax. If the serving cell is not congested, the serving cell communication rate calculating unit 170 performs such a calculation that the effective communication rate Reff becomes closer to the expected maximum communication rate Rmax.

An example of the calculation to be performed by the serving cell communication rate calculating unit 170 is a calculation method expressed by Mathematical Formulas 6 and 7 shown below.

$$Reff = \alpha \cdot Rmax \qquad \text{Mathematical Formula 6}$$

$$\alpha = -0.4 \cdot kcong + 0.5 \qquad \text{Mathematical Formula 7}$$

In a case where the expected maximum communication rate Rmax is 28.27 MHz and the degree of congestion kcong is 0.2, for example, the effective communication rate Reff is calculated to be 11.8734 Mbps according to Mathematical Formulas 6 and 7. In this case, however, the effective communication rate Reff is rounded to two decimal places, for example, and is displayed as 11.87 Mbps.

The calculation to be performed by the serving cell communication rate calculating unit 170 is not limited to Mathematical Formulas 6 and 7, and Mathematical Formula 7 may be a linear function including a different coefficient, a higher-order function, or a function including an exponential function, a logarithmic function, a trigonometric function, or the like.

The calculation according to Mathematical Formula 7 may be formed in the form of a table in which coefficients corresponding to degrees of congestion are listed, and a coefficient α may be referred to, with a degree of congestion being the argument.

The display unit 180 displays the effective communication rate Reff calculated by the serving cell communication rate calculating unit 170. An example of this display will be described in detail, with reference to FIG. 4. The display on the display unit 180 may be dynamically updated at fixed or various intervals, or when there is a change in the effective communication rate Reff. The display unit 180 may also display other information related to communication quality. The other information related to communication quality is the maximum communication rate Rmax calculated by the serving cell maximum communication rate calculating unit 160 and the degree of congestion kcong calculated by the serving cell congestion calculating unit 140. For example, a display panel such as an organic EL (Electro Luminescence) panel or an LCD (Liquid Crystal Display) panel can be used as the display unit 180.

[Example of Display of an Effective Communication Rate]

Figure 4:
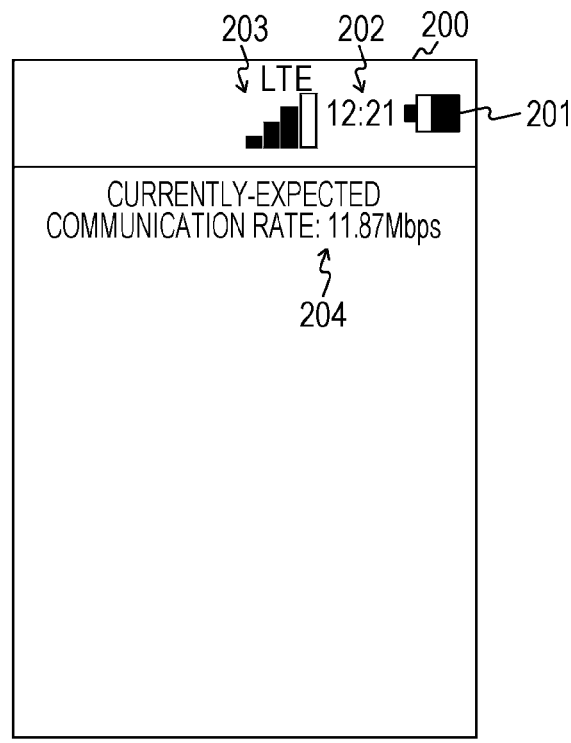
FIG. 4 is a diagram showing an example of display (a display screen 200) of the value of an effective communication rate calculated by a serving cell communication rate calculating unit 170 in the first embodiment of the present technique.

FIG. 4 is a diagram showing an example of display (a display screen 200) of the value of an effective communication rate calculated by the serving cell communication rate calculating unit 170 in the first embodiment of the present technique.

The display screen 200 is a display screen that displays the value of an effective communication rate calculated by the serving cell communication rate calculating unit 170. The display screen 200 includes a battery icon display region 201, a time display region 202, an antenna bar display region 203, and an effective communication rate display region 204, for example. FIG. 4 shows an example case where the effective communication rate Reff (11.87 Mbps) calculated by using Mathematical Formulas 6 and 7 is displayed in the effective communication rate display region 204.

The value of the effective communication rate displayed on the display screen 200 may be dynamically updated at fixed or various intervals. Alternatively, the value of the effective communication rate displayed on the display screen 200 may be updated only when a change in the value of the displayed effective communication rate exceeds a threshold value.

The display of an effective communication rate is not limited to the example case where a numerical value is displayed in the form of text as shown in FIG. 4, and an effective communication rate may be displayed in some other form. For example, it is possible to perform meter display, icon display, display using a widget, or display that can cause the user to recognize the level of the effective communication rate through color gradations. The display using a widget is a display method of displaying a small window in an upper right portion of the display screen and showing the effective communication rate in the small window, for example.

[Examples of Display of the Maximum Communication Rate]

FIGS. 5 and 6 are diagrams showing examples of display (display screens 210 and 230) of the maximum communication rate calculated by the serving cell maximum communication rate calculating unit 160 in the first embodiment of the present technique.

The display screen 210 shown in FIGS. 5a and 5b is a display screen that displays the numerical value of the maximum communication rate calculated by the serving cell maximum communication rate calculating unit 160. The display screen 210 includes a battery icon display region 201, a time display region 202, an antenna bar display region 203, and a maximum communication rate display region 220, for example.

The display screen 230 shown in FIGS. 6a and 6b is a display screen that displays an icon indicating the value of the maximum communication rate calculated by the serving cell maximum communication rate calculating unit 160. The display screen 230 includes a battery icon display region 201, a time display region 202, an antenna bar display region 203, and a maximum communication rate display region 240, for example.

FIGS. 5 and 6 also show examples of display transitions in cases where the maximum communication rate varies with the reference signal-to-noise ratio (SNR) in a service with a maximum rate of 37.5 Mbps.

In the display examples shown in FIG. 5a and FIG. 6a, the maximum communication rate calculated by the serving cell maximum communication rate calculating unit 160 is 34.7 Mbps, for example. In the display examples shown in FIG. 5b and FIG. 6b, the maximum communication rate calculated by the serving cell maximum communication rate calculating unit 160 is 12.0 Mbps, for example.

The maximum communication rates displayed on the display screens 210 and 230 may be dynamically updated at fixed or various intervals. Alternatively, each of the maximum communication rates displayed on the display screens 210 and 230 may be updated only when a change in the value of the displayed maximum communication rate exceeds a threshold value.

The display of the maximum communication rate is not limited to the display examples shown in FIGS. 5 and 6, and the maximum communication rate may be displayed in some other form. For example, it is possible to perform meter display, some other icon display, display using a widget, or display that can cause the user to recognize the level of the maximum communication rate through color gradations.

[Examples of Display of a Degree of Congestion]

FIGS. 7a to 7c are diagrams showing an example of display (a display screen 250) of a degree of congestion calculated by the serving cell congestion calculating unit 140 in the first embodiment of the present technique.

The display screen 250 is a display screen that displays a degree of congestion calculated by the serving cell congestion calculating unit 140 in three levels (vacant, normal, or congested). The display screen 250 includes a congestion display region 260, for example. Other display regions (a battery icon display region, a time display region, and an antenna bar display region) are also included, as in the display examples shown in FIGS. 4 through 6.

The degree of congestion is low in the display example shown in FIG. 7a, the degree of congestion is normal in the display example shown in FIG. 7b, and the degree of congestion is high in the display example shown in FIG. 7c.

The degree of congestion displayed on the display screen 250 may be dynamically updated at fixed or various intervals. Alternatively, the degree of congestion displayed on the display screen 250 may be updated only when a change in the displayed degree of congestion exceeds a threshold value.

The display of a degree of congestion is not limited to the display examples shown in FIGS. 7a to 7c, and a degree of congestion may be displayed in some other form. For example, it is possible to perform numerical value display, meter display, icon display, display using a widget, or display that can cause the user to recognize the degree of congestion through color gradations.

The display screens shown in FIGS. 4 through 7 may be switched by a user operation. Two or three of the values of an effective communication rate, a maximum communication rate, and a degree of congestion may be simultaneously displayed. Information related to other aspects of communication quality (such as the strength of a reference signal, the strength of a received signal, the strength of a signal, and an SNR) may also be displayed on the display screens shown in FIGS. 4 through 7.

[Example Operation of the Wireless Communication Device]

Figure 8:
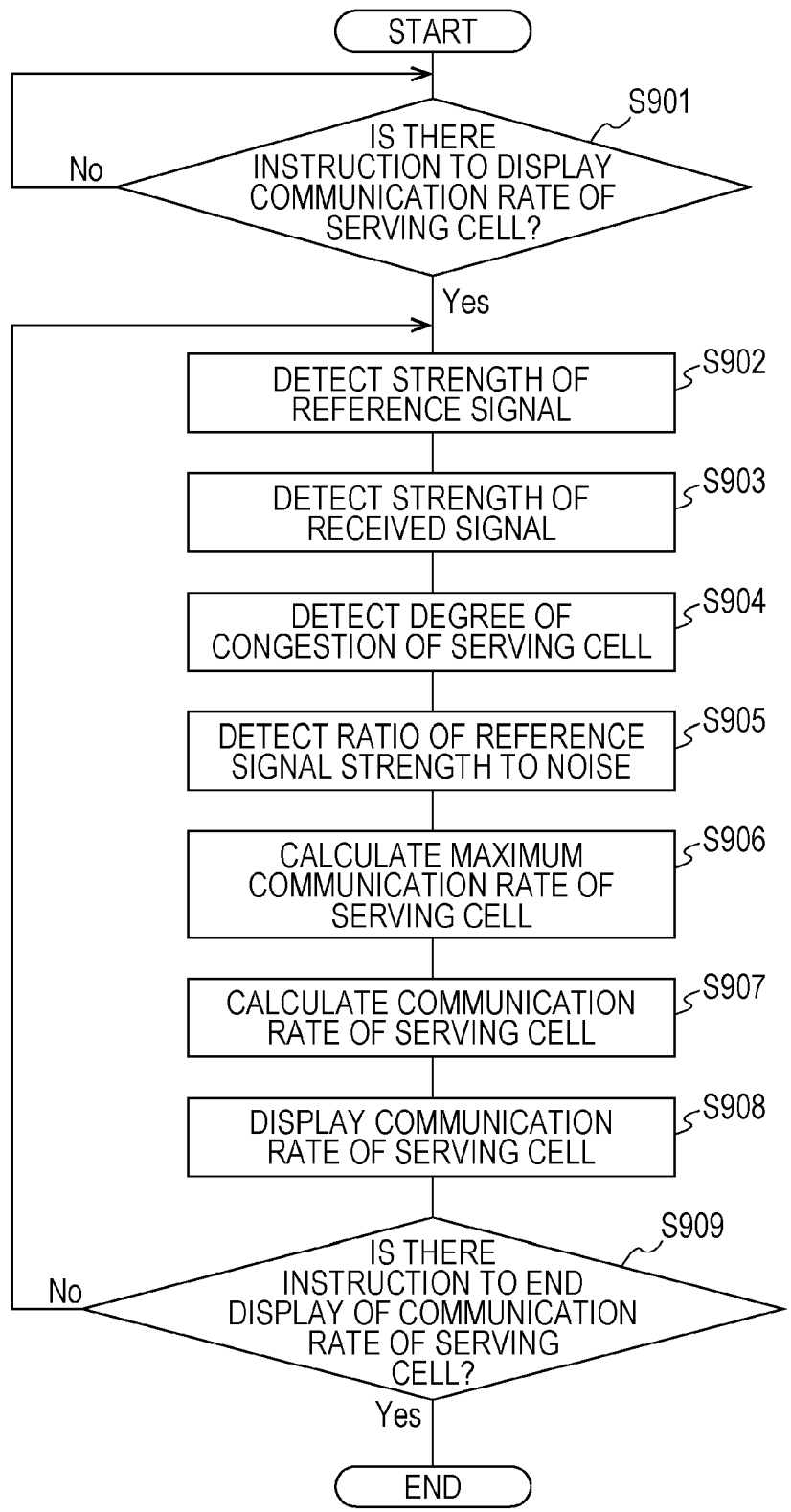
FIG. 8 is a flowchart showing an example of the procedures in a communication rate display process to be performed by the wireless communication device 100 in the first embodiment of the present technique.

FIG. 8 is a flowchart showing an example of the procedures in a communication rate display process to be performed by the wireless communication device 100 in the first embodiment of the present technique. FIG. 8 shows an example case where the value of an effective communication rate calculated by the serving cell communication rate calculating unit 170 is displayed on the display unit 180.

First, a check is made to determine whether there is an instruction to display the communication rate of the serving cell (step S901), and, if such a display instruction has not been issued, monitoring is continued. If there is an instruction to display the communication rate of the serving cell (step S901), on the other hand, the reference signal strength detecting unit 120 detects the strength of a reference signal (step S902). Step S902 is an example of the particular signal strength acquiring procedure in the claims. The received signal strength detecting unit 130 then detects the strength of a received signal (step S903). Step S903 is an example of the received signal strength acquiring procedure in the claims.

The serving cell congestion calculating unit 140 then calculates a degree of congestion based on the detected reference signal strength and the detected received signal strength (step S904). Step S904 is an example of the congestion calculating procedure in the claims. The reference signal-to-noise ratio detecting unit 150 then detects the ratio of the signal strength of the reference signal to noise (step S905).

The serving cell maximum communication rate calculating unit 160 then calculates the maximum communication rate to be expected when the serving cell is used (step S906). Based on the value of the expected maximum communication rate and the degree of congestion of the serving cell, the serving cell communication rate calculating unit 170 calculates the value of an effective communication rate (step S907), and causes the display unit 180 to display the result of the calculation (step S908).

A check is then made to determine whether there is an instruction to end the display of the communication rate of the serving cell (step S909), and, if such a display end instruction has not been issued, the process returns to step S902. If an instruction to end the display of the communication rate of the serving cell has been issued (step S909), on the other hand, the communication rate display process is ended.

As described above, according to the first embodiment of the present technique, a degree of congestion of a base station can be accurately calculated. A degree of congestion of a base station can be accurately calculated not only in the code division multiplexing system but also in a system in which reference signals are allocated to some resource blocks, and information is allocated to the other resource blocks as in the frequency division multiple access system, for example. A degree of congestion of a base station can be calculated when the wireless communication device 100 is in a standby state, for example.

According to the first embodiment of the present technique, a value of the maximum communication rate that dynamically varies depending on the position where the wireless communication device 100 is located can also be accurately calculated. A value of an effective communication rate that dynamically varies depending on the position where the wireless communication device 100 is located or the current time can also be accurately calculated.

As the respective pieces of information calculated in the above manner are displayed, a user can promptly recognize the communication quality related to the position where the wireless communication device 100 is located. For example, a user can promptly recognize a value of an effective communication rate that dynamically varies depending on the position where the wireless communication device 100 is located or the current time.

<2. Second Embodiment>

In the first embodiment of the present technique, information about communication quality is displayed to notify a user of the communication quality. An example case where a wireless communication device is located in an area with poor communication quality is now described. In this case, the communication quality might be improved by switching the connection to a base station of another telecommunications operator existing in the area.

In view of this, a second embodiment of the present technique concerns an example case where connection rights are switched when a wireless communication device is located in an area with poor communication quality. The wireless communication device in the second embodiment of the present technique is formed by partially modifying the wireless communication device 100 shown in FIG. 1 and others. Therefore, the same components as those of the wireless communication device 100 are denoted by the same reference numerals as those used for the wireless communication device 100, and part of the explanation of them will not be repeated.

[Example Structure of a Wireless Communication Device]

Figure 9:
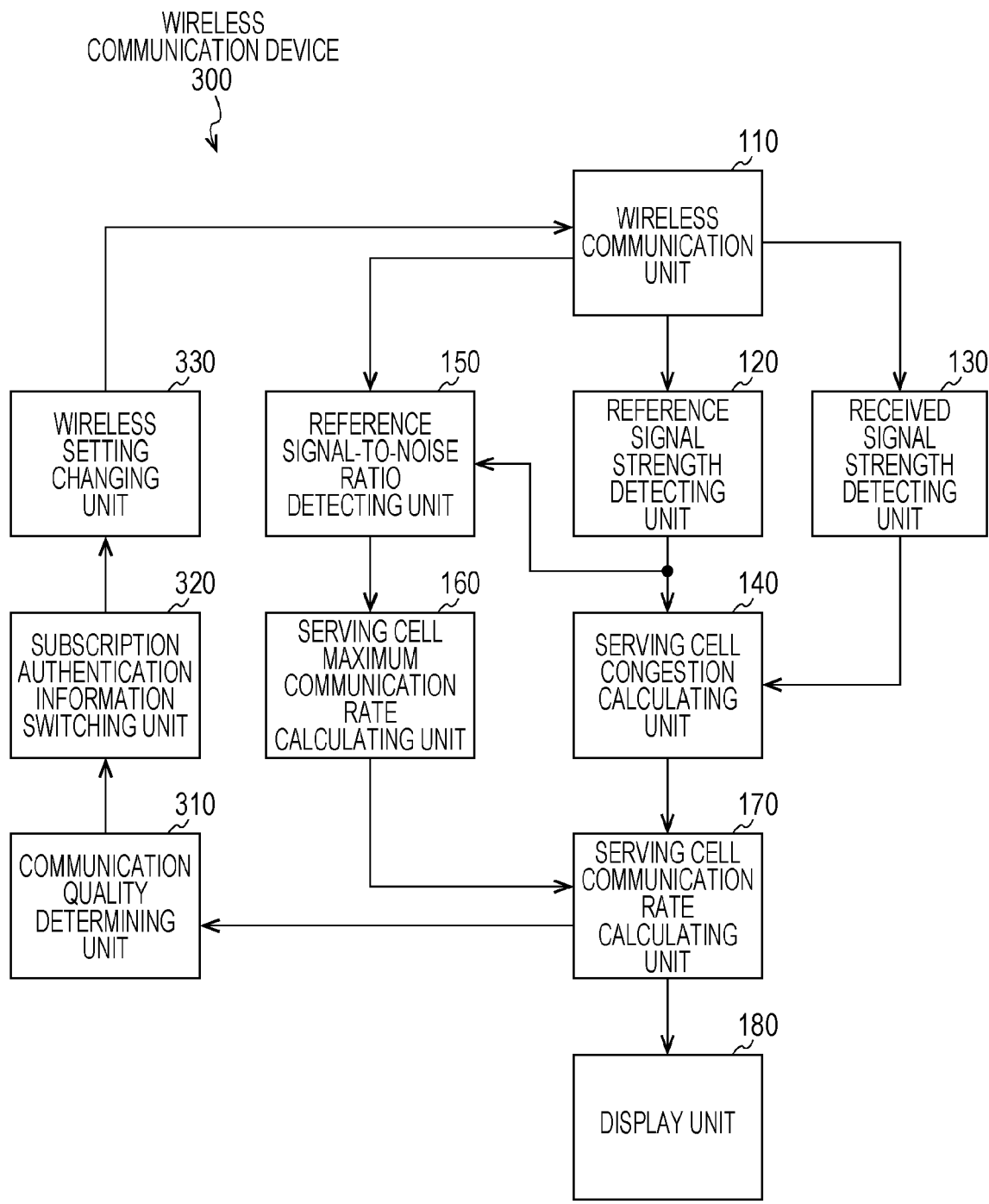
FIG. 9 is a block diagram showing an example functional structure of a wireless communication device 300 in a second embodiment of the present technique.

FIG. 9 is a block diagram showing an example functional structure of a wireless communication device 300 in the second embodiment of the present technique.

The wireless communication device 300 includes a communication quality determining unit 310, a subscription authentication information switching unit 320, and a wireless setting changing unit 330. The serving cell communication rate calculating unit 170 also outputs the value of the calculated effective communication rate to the communication quality determining unit 310.

Based on the value of the effective communication rate calculated by the serving cell communication rate calculating unit 170, the communication quality determining unit 310 determines communication quality of the wireless communication, and outputs the result of the determination to the subscription authentication information switching unit 320.

For example, if the effective communication rate is equal to or higher than a threshold value, the communication quality determining unit 310 determines the communication quality to be "good", and, if the effective communication rate is lower than the threshold value, the communication quality determining unit 310 determines the communication quality to be "poor". The determination to be made by the communication quality determining unit 310 is not limited to the two levels of "good" and "poor", and communication quality may be determined in three or more levels, such as the five levels of 1) very poor, 2) poor, 3) medium, 4) good, and 5) very good.

The determination to be made by the communication quality determining unit 310 is not limited to communication quality determination based on the value of an effective communication rate calculated by the serving cell communication rate calculating unit 170. For example, the communication quality determining unit 310 may determine communication quality by using at least one of the following items: a received signal strength, a reference signal strength, a signal-to-noise ratio, a degree of congestion of the base station, and the maximum communication rate. The reference signal strength is detected by the reference signal strength detecting unit 120, the received signal strength is detected by the received signal strength detecting unit 130, and the degree of congestion of the base station is detected by the serving cell congestion calculating unit 140. The signal-to-noise ratio is detected by the reference signal-to-noise ratio detecting unit 150, and the maximum communication rate is calculated by the serving cell maximum communication rate calculating unit 160. The communication quality determining unit 310 is an example of the determining unit in the claims.

The subscription authentication information switching unit 320 performs control to switch the subscription authentication information set in the wireless communication device 300 based on the determination result output from the communication quality determining unit 310. Specifically, the subscription authentication information switching unit 320 performs control to switch connection rights for the wireless communication device 300 to connect to a base station by using wireless communication based on the determination result output from the communication quality determining unit 310. When switching subscription authentication information, the subscription authentication information switching unit 320 notifies the wireless setting changing unit 330 to that effect.

In a case where the determination result output from the communication quality determining unit 310 is "poor" on the two-point scale (or "2 poor" or lower) on the five-point scale), for example, the subscription authentication information switching unit 320 switches subscription authentication information so as to use a communication service being provided by another telecommunications operator.

An example case where subscription authentication information is set by a USIM card mounting unit on which more than one USIM card can be mounted is now described. In this case, the subscription authentication information switching unit 320 performs control to invalidate the currently valid USIM card and validate another USIM card among the USIM cards mounted on the USIM card mounting unit. In this manner, subscription authentication information can be switched.

As a USIM card mounting unit on which USIM cards can be mounted is included in the wireless communication device 300 as described above, the wireless communication device 300 that can dynamically select the best wireless communication network (telecommunications operator) among wireless communication networks can be provided.

Another example case where subscription authentication information is set in terms of software by a special memory that stores pieces of subscription authentication information is now described. In this case, the subscription authentication information switching unit 320 performs control to invalidate the currently valid piece of subscription authentication information and validate another piece of subscription authentication information among the pieces of subscription authentication information stored in the memory. In this manner, subscription authentication information can be switched. Here, the expression "switching in terms of software" also include rewriting of data and the like. For example, it is possible to use a memory that can perform a validation process and an invalidation process on subscription authentication information, instead of the special memory in which subscription authentication information is written in a static manner. The subscription authentication information to be switched may be downloaded from another information processing device (such as a server operated by a telecommunications operator handling subscription authentication information) via the wireless communication unit 110.

A validation process and an invalidation process on USIMs may be performed by the validation process and the invalidation process specified in 3GPP (Third Generation Partnership Project). These processes are performed at shops selling portable telephone devices, for example.

In a case where the subscription authentication information switching unit 320 outputs a notification of switching of subscription authentication information, the wireless setting changing unit 330 changes parameters for necessary wireless communication so that a communication service being provided by the telecommunications operator handling the subscription authentication information after the switching can be received. Specifically, in accordance with the subscription authentication information switching performed by the subscription authentication information switching unit 320, the wireless setting changing unit 330 performs control to change at least one of the settings with respect to the carrier frequency and the wireless communication method at the wireless communication unit 110. For example, the wireless setting changing unit 330 automatically changes the carrier frequency or the wireless communication method to the one corresponding to the communication service being provided by the telecommunications operator handling the subscription authentication information after the switching.

An example case where a telecommunications operator A and a telecommunications operator B provide communication services through HSPA (High Speed Packet Access) and LTE is now described. When switching from the HSPA service of the telecommunications operator A to the HSPA service of the telecommunications operator B is performed, it is necessary to switch from the carrier frequency of the telecommunications operator A to the carrier frequency of the telecommunications operator B in accordance with switching of subscription authentication information.

When switching from the HSPA service of the telecommunications operator A to the LTE service of the telecommunications operator B is performed, it is necessary to perform carrier frequency switching and communication method switching in accordance with switching of subscription authentication information. That is, when switching from the HSPA service of the telecommunications operator A to the LTE service of the telecommunications operator B is performed, switching from the carrier frequency of the telecommunications operator A to the carrier frequency of the telecommunications operator B is performed in accordance with switching of subscription authentication information. Also, communication method switching from HSPA to LTE is performed in accordance with the switching of subscription authentication information.

When switching from the LTE service of the telecommunications operator A to the LTE service of the telecommunications operator B is performed, settings with respect to carrier waves are changed, and, if the carrier frequency band differs between the two LET services, settings with respect to carrier frequency bands are also changed. In a case where duplex method switching between FDD (Frequency Division Duplex) and TDD (Time Division Duplex) is performed, settings with respect to duplex methods may also be changed.

An example case where one telecommunications operator provides more than one communication service (such as a UMTS service and an LTE service) is now described. In this case, the subscription authentication information switching unit 320 may not switch subscription authentication information, but the wireless setting changing unit 330 may change only the parameters related to wireless communication such as communication methods and carrier frequencies.

An example case where the subscription authentication information switching unit 320 switches subscription authentication information to switch telecommunications operators to be used is now described. In this case, the wireless setting changing unit 330 may automatically change the parameters related to wireless communication, so as to receive a higher-speed communication service being provided by the telecommunications operator after the switching.

A communication method change involves many changes such as an occupied bandwidth and a duplex method change between FDD and TDD. In the case of TDD, a communication method change further involves many changes such as changes in the rate per frame in uplink and downlink. Communication methods are not limited to HSPA and LTE, and other methods may be used. For examples, communication methods include GSM (Global System for Mobile communications, a registered trade name), CDMA (Code Division Multiple Access) 2000, and the like. Communication methods also include W-CDMA (Wideband Code Division Multiple Access), UMTS (Universal Mobile Telecommunications System), and the like. Communication methods further include HSDPA (High Speed Downlink Packet Access), HSPA+ (High Speed Packet Access Plus), LTE-Advanced, and the like.

As described above, the subscription authentication information switching unit 320 and the wireless setting changing unit 330 perform control to switch connection rights in the wireless communication device 300. The subscription authentication information switching unit 320 and the wireless setting changing unit 330 are an example of the switch control unit in the claims.

The communication quality determining process by the communication quality determining unit 310, the subscription authentication information switching process by the subscription authentication information switching unit 320, and the changing process by the wireless setting changing unit 330 may be performed only when the wireless communication device 100 is in a standby state.

[Example Operation of the Wireless Communication Device]

Figure 10:
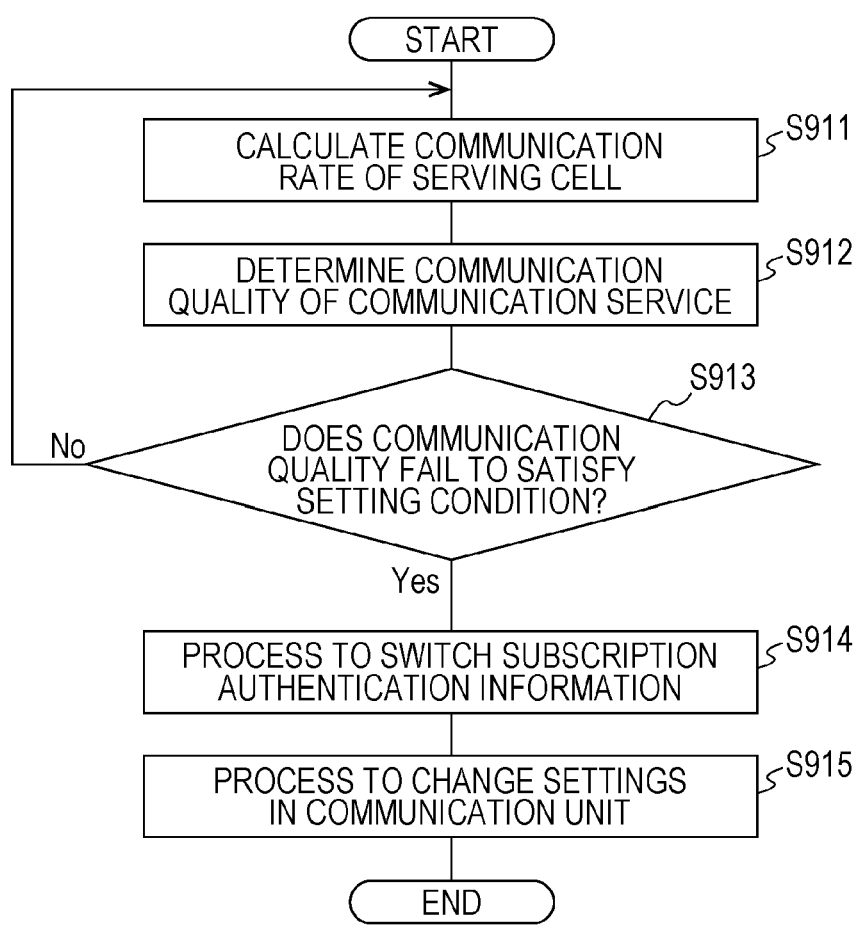
FIG. 10 is a flowchart showing an example of the procedures in a subscription authentication information switching process to be performed by the wireless communication device 300 in the second embodiment of the present technique.

FIG. 10 is a flowchart showing an example of the procedures in a subscription authentication information switching process to be performed by the wireless communication device 300 in the second embodiment of the present technique.

First, the communication rate of the serving cell is calculated (step S911). Step S911 is equivalent to steps S902 through s907 shown in FIG. 8.

The communication quality determining unit 310 then determines the communication quality of the communication service (step S912), and determines whether the communication quality of the communication service fails to satisfy a setting condition (step S913). For example, the communication quality determining unit 310 determines whether the calculated communication rate of the serving cell is lower than a threshold value (step S913).

If the communication quality of the communication service satisfies the setting condition (step S913), the communication quality determination on the communication service is repeatedly performed at fixed or various intervals (steps S911 and S912).

If the communication quality of the communication service fails to satisfy the setting condition (step S913), the subscription authentication information switching unit 320 performs a subscription authentication information switching process (step S914). The wireless setting changing unit 330 then performs a setting changing process to change the settings in the wireless communication unit 110 (step S915).

As described above, according to the second embodiment of the present technique, an optimum communication service can be automatically selected in the wireless communication device 300 located in an environment where more than one communication service is available. That is, an optimum communication service can be selected in a communication environment that dynamically changes depending on the position where the wireless communication device 300 is located or the current time.

<3. Third Embodiment>

In the examples described in the first and second embodiments of the present technique, information related to communication quality (communication quality information) calculated by a wireless communication device is displayed. The communication quality information calculated in the above manner might be managed by an information processing device and be provided to other wireless communication devices.

In view of this, a third embodiment of the present technique concerns an example case where information related to communication quality (communication quality information) calculated by a wireless communication device is managed by an information processing device and is used. The wireless communication device in the third embodiment of the present technique is formed by partially modifying the wireless communication device 100 shown in FIG. 1 and others. Therefore, the same components as those of the wireless communication device 100 are denoted by the same reference numerals as those used for the wireless communication device 100, and part of the explanation of them will not be repeated.

[Example Structure of a Communication System]

Figure 11:
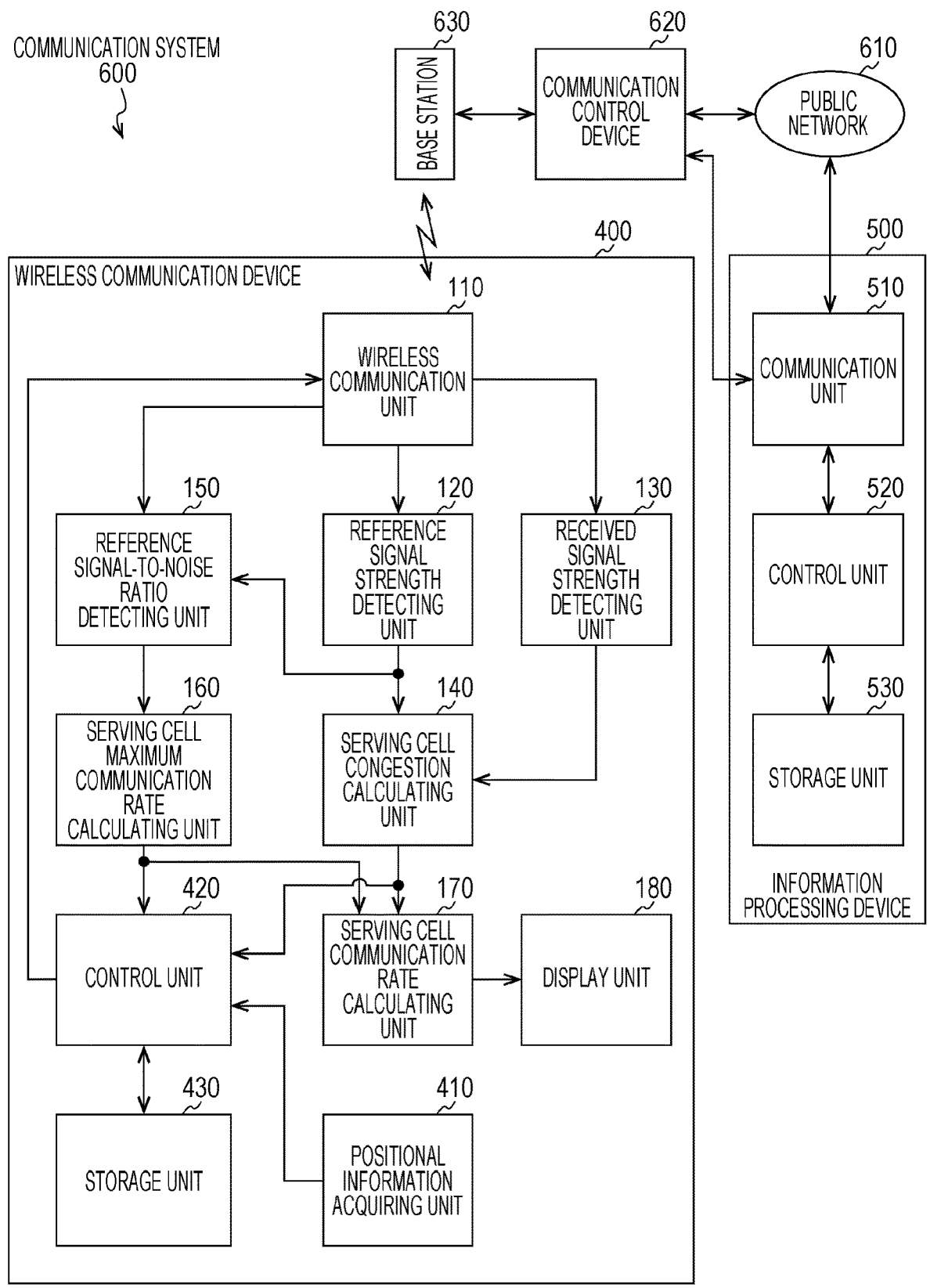
FIG. 11 is a block diagram showing an example functional structure of a communication system 600 in a third embodiment of the present technique.

FIG. 11 is a block diagram showing an example functional structure of a communication system 600 in the third embodiment of the present technique.

The communication system 600 includes a wireless communication device 400, an information processing device 500, a public network 610, a communication control device 620, and a base station 630.

The public network 610 is a public network such as a telephone network or the Internet. The public network 610 and the communication control device 620 are connected via a gateway (not shown).

The base station 630 is a base station operated by a telecommunications operator, and is a mobile communication base station (NodeB or eNodeB) that wirelessly connects a wireless communication device holding subscription authentication information related to the telecommunications operator, to the communication control device 620 operated by the telecommunications operator.

For ease of explanation, FIG. 11 shows only one telecommunications operator (the telecommunications operator operating the communication control device 620). However, this embodiment can also be applied in cases where two or more telecommunications operators exist. Also, for ease of explanation, FIG. 11 shows only the base station 630 as the base station operated by the telecommunications operator. However, this embodiment can also be applied in cases where two or more base stations are operated by the telecommunications operator. In a case where the telecommunications operator operates two or more base stations, the respective base stations may be operated at different carrier frequencies by different communication methods.

The communication control device 620 is a communication control device managed by a telecommunications operator providing a wireless connection service, and performs authentication control on a wireless communication device connected thereto via the base station 630. The communication control device 620 then connects the authenticated wireless communication device to the public network 610 via a gateway (not shown).

Here, the communication control device 620 authenticates only the wireless communication device holding subscription authentication information related to the telecommunications operator operating the communication control device 620, among the wireless communication devices connected to the communication control device 620 via the base station 630, except for some particular cases. The particular cases may be cases where a call is made for emergency (where a call is made to the police, the fire department, or the like).

The communication control device 620 also outputs various kinds of information transmitted from the wireless communication device 400 via the base station 630 to the information processing device 500, and transmits various kinds of information output from the information processing device 500 to the wireless communication device 400 via the base station 630.

[Example Structure of a Wireless Communication Device]

The wireless communication device 400 includes a positional information acquiring unit 410, a control unit 420, and a storage unit 430.

The positional information acquiring unit 410 acquires information (positional information (latitude, longitude, and altitude, for example)) about the position where the wireless communication device 400 is located (the position of existence), and outputs the acquired positional information to the control unit 420. The positional information acquiring unit 410 is realized by a GPS receiver that receives GPS (Global Positioning System) signals and calculates latitude, longitude, and altitude, for example. Alternatively, the positional information acquiring unit 410 may acquire positional information from another information processing device (such as an information processing device (the communication control device 620, for example) operated by the telecommunications operator related to the current subscription authentication information). For example, the positional information acquiring unit 410 can acquire, from another information processing device, information (positional information) about the position corresponding to the identification information about a base station for wireless communication devices (such as portable telephone devices) or a wireless LAN (Local Area Network) access point. The identification information about a base station for wireless communication devices may be a cell ID, for example, and the identification information about a wireless LAN access point may be an SSID (Service Set Identifier), for example.

The control unit 420 performs control to associate information calculated by respective components with the positional information acquired by the positional information acquiring unit 410, and store the information associated with the positional information into the storage unit 430. The control unit 420 also performs control to transmit the information stored in the storage unit 430 to the information processing device 500 via the wireless communication unit 110 at fixed or various intervals. For example, the control unit 420 associates the degree of congestion of the serving cell detected by the serving cell congestion calculating unit 140 and the maximum communication rate of the serving cell detected by the serving cell maximum communication rate calculating unit 160 with the positional information, and stores the degree of congestion and the maximum communication rate associated with the positional information into the storage unit 430. In this case, the control unit 420 may associate the times at which respective pieces of information were calculated or time information about the detection times with the respective pieces of information, and store the detection times or the time information associated with the respective pieces of information into the storage unit 430.

The control unit 420 may also associate the reference signal strength detected by the reference signal strength detecting unit 120 and the received signal strength detected by the received signal strength detecting unit 130 with the positional information, and store the strengths associated with the positional information into the storage unit 430. Likewise, the control unit 420 may also associate the reference signal-to-noise ratio detected by the reference signal-to-noise ratio detecting unit 150 and the communication rate of the serving cell detected by the serving cell communication rate calculating unit 170 with the positional information, and store the rates associated with the positional information into the storage unit 430. Alternatively, the control unit 420 may store all or part of the above information into the storage unit 430. The control unit 420 may associate at least one piece of the above information with the positional information, and transmit the piece(s) of information associated with the positional information to the information processing device 500.

Under the control of the control unit 420, the storage unit 430 stores the information calculated by the respective components with the positional information acquired by the positional information acquiring unit 410, and supplies the stored pieces of information to the control unit 420. An example of the contents of the storage unit 430 will be described later in detail, with reference to FIG. 12.

[Example Structure of the Information Processing Device]

The information processing device 500 is an information processing device operated by an operator that provides various kinds of communication services. The information processing device 500 also manages the communication quality information transmitted from the wireless communication device 400, and provides the managed communication quality information to wireless communication devices (including the wireless communication device 400). The operator that provides various kinds of communication services may be a telecommunications operator providing a wireless connection service, an MVNO (Mobile Virtual Network Operator, an operator in a business form called a virtual communication operator), or the like.

The information processing device 500 includes a communication unit 510, a control unit 520, and a storage unit 530.

The communication unit 510 transmits and receives various kinds of information to and from the wireless communication device 400 via the base station 630 operated by a telecommunications operator (the telecommunications operator operating the communication control device 620). The communication unit 510 is an example of the acquiring unit in the claims.

The control unit 520 performs control to store the respective pieces of information transmitted from the wireless communication device 400 into the storage unit 530. The control unit 520 also performs control to provide the respective pieces of information stored in the storage unit 530 to one or more wireless communication devices (including the wireless communication device 400).

Under the control of the control unit 520, the storage unit 530 classifies the respective pieces information transmitted from the wireless communication device 400 by position, stores the respective pieces of information classified by position, and supplies the stored pieces of information to the control unit 520. For example, the maximum communication rate calculated by the serving cell maximum communication rate calculating unit 160, the degree of congestion calculated by the serving cell congestion calculating unit 140, and the positional information acquired by the positional information acquiring unit 410 are associated with one another, and are stored into the storage unit 530. An example of the contents of the storage unit 530 will be described later in detail, with reference to FIG. 13.

As described above, the information processing device 500 receives communication quality information related to the maximum communication rates and the degrees of congestion of respective base stations (or cells) received from one or more wireless communication devices via the communication unit 510, and stores the communication quality information into the storage unit 530.

The information processing device 500 may have functions equivalent to the serving cell congestion calculating unit 140 and the serving cell maximum communication rate calculating unit 160 included in the wireless communication device 400. In this case, the wireless communication device 400 associates outputs results (an RSRP, an RSSI, and an SNR) of the reference signal strength detecting unit 120, the received signal strength detecting unit 130, and the reference signal-to-noise ratio detecting unit 150 with the positional information, and transmits the output results associated with the positional information to the information processing device 500. The serving cell congestion calculating unit (the control unit 520, for example) included in the information processing device 500 then calculates a degree of congestion of the base station by using the reference signal strength and the received signal strength. The wireless communication device 400 may associate the RSRQ calculated based on the output results with the positional information, and transmit the RSRQ associated with the positional information to the information processing device 500. As a result of this, the information processing device 500 can perform a serving cell congestion calculating process and a serving cell maximum communication rate calculating process, and the load on the wireless communication device 400 can be reduced accordingly. The wireless communication device 400 may also associate the above output results with the times at which the respective pieces of information were calculated or time information about the detection times, and transmit the output results associated with the detection times or the time information to the information processing device 500.

The wireless communication device 400 may also associate information that changes only a little with time (or static information) with the positional information, and transmit the information associated with the positional information to the information processing device 500. The information (static information) that changes only a little with time is the output results (an RSRP and an SNR) of the reference signal strength detecting unit 120 and the reference signal-to-noise ratio detecting unit 150, for example. In a case where the information processing device 500 receives RSRPs and SNRs from wireless communication devices, averaging may be performed on those RSRPs and SNRs to be managed. For example, the average values of the respective values related to the same position are calculated, and these average values are managed.

Alternatively, the wireless communication device 400 may acquire the information (such as the information (an RSRP and an SNR) that varies only a little with time) associated with the positional information corresponding to the area where the wireless communication device 400 is located, from the information processing device 500. In this case, the information processing device 500 can provide the wireless communication device 400 with the averages values of RSRPs and SNRs acquired from wireless communication devices. In the case where the wireless communication device 400 can acquire an RSRP and an SNR as described above, the reference signal strength detecting unit 120 and the reference signal-to-noise ratio detecting unit 150 may not be included in the wireless communication device 400.

[Example of the Contents of the Storage Unit of the Wireless Communication Device]

FIG. 12 is a diagram schematically showing an example of the contents of the storage unit 430 of the wireless communication device 400 in the third embodiment of the present technique.

The storage unit 430 stores the maximum communication rate calculated by the serving cell maximum communication rate calculating unit 160, the degree of congestion calculated by the serving cell congestion calculating unit 140, and the positional information acquired by the positional information acquiring unit 410, which are associated with one another. Although the storage unit 430 can store other information associated with the positional information as described above, FIG. 12 shows only maximum communication rates and degrees of congestion, for ease of explanation.

The storage unit 430 stores times 431, LACs (Location Area Codes) 432, CIDs (cell IDs) 433, latitudes 434, longitudes 435, maximum communication rates 436, and degrees of congestion 437, which are associated with one another.

Each of the times 431 is the time at which each corresponding piece of information was calculated.

Each of the LACs 432 is the identification information for identifying the area where the wireless communication device 400 is located.

Each of the CIDs 433 is the identification information for identifying the cell in which the wireless communication device 400 is located (the base station to which the wireless communication device 400 is connected). In the area identified by an LAC 432, one or more base stations (cells) are located. With an LAC 432 and a CID 433, one base station can be identified. If some other identification information for identifying base stations is used, the other identification information may be associated with the above described identification information, and be stored.

Each of the latitudes 434 and the longitude 435 are the positional information for identifying the position where the wireless communication device 400 is located, and is acquired by the positional information acquiring unit 410.

Each of the maximum communication rates 436 is a maximum communication rate calculated by the serving cell maximum communication rate calculating unit 160.

Each of the degrees of congestion 437 is a degree of congestion calculated by the serving cell congestion calculating unit 140.

[Example of the Contents of the Storage Unit of the Information Processing Device]

Figure 13:
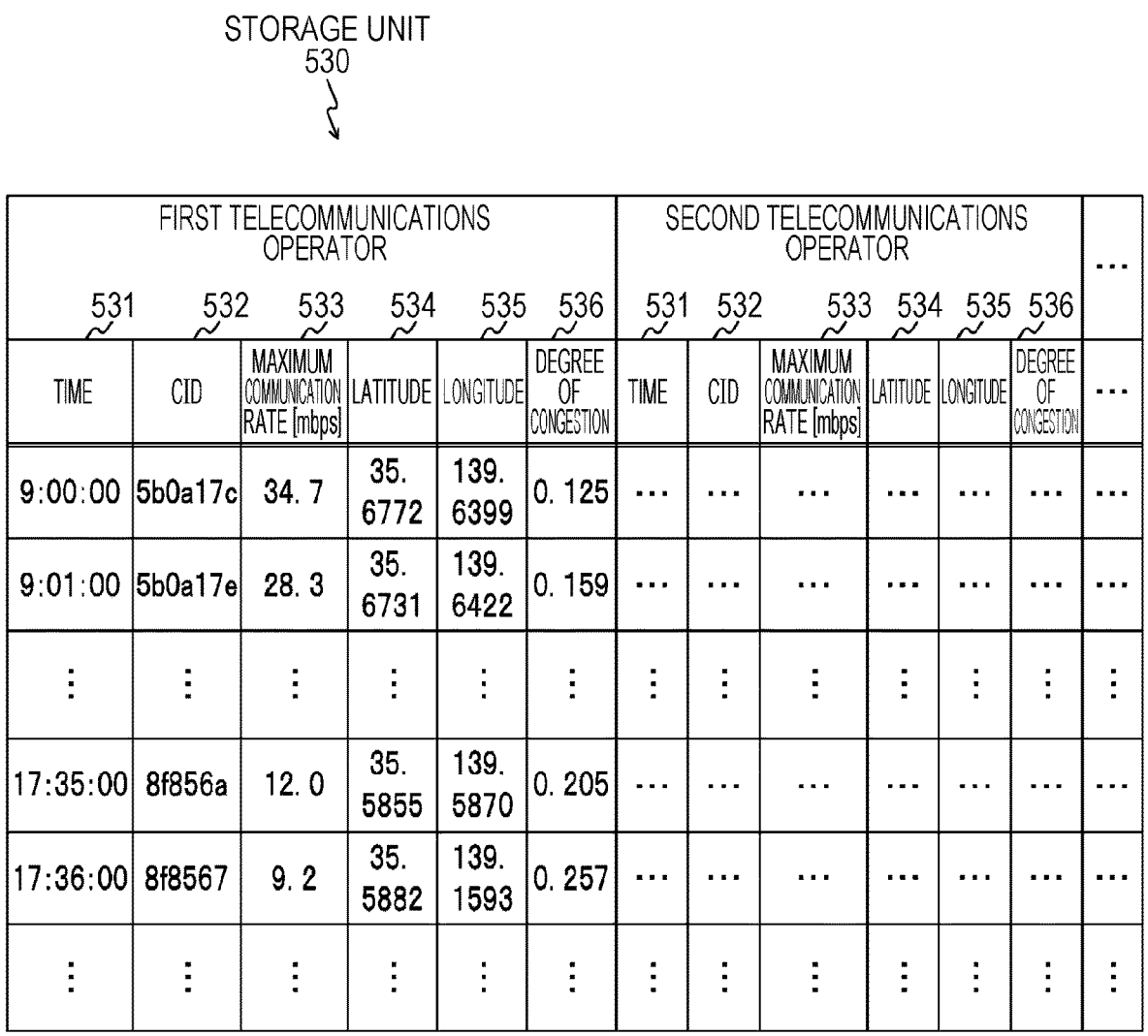
FIG. 13 is a diagram schematically showing an example of the contents of a storage unit 530 of an information processing device 500 in the second embodiment of the present technique.

FIG. 13 is a diagram schematically showing an example of the contents of the storage unit 530 of the information processing device 500 in the second embodiment of the present technique.

The storage unit 530 classifies information transmitted from one or more wireless communication devices (including the wireless communication device 400) by position, and stores the information for each telecommunications operator. For ease of explanation, FIG. 13 shows only a first telecommunications operator and a second telecommunications operator as the telecommunications operators. Times 531, CIDs 532, maximum communication rates 533, latitudes 534, longitudes 535, and degrees of congestion 536 correspond to the times 431, the CIDs 433, the latitudes 434, the longitudes 435, the maximum communication rates 436, and the degrees of congestion 437 shown in FIG. 12, respectively. Therefore, explanation for them will not be repeated herein. Although the storage unit 530 can store other information that is transmitted from wireless communication devices and is associated with the positional information, FIG. 13 shows only maximum communication rates and degrees of congestion, for ease of explanation.

In a case where the information (the information related to the same position) to be stored in the storage unit 530 is transmitted from wireless communication devices (including the wireless communication device 400), the control unit 520 may calculate the average values of the respective pieces of information, and store the average values into the storage unit 530.

An example case where a wireless communication device uses the information stored in the storage unit 530 of the information processing device 500 will be described later in detail, with reference to FIG. 15.

[Example Operation of the Wireless Communication Device]

Figure 14:
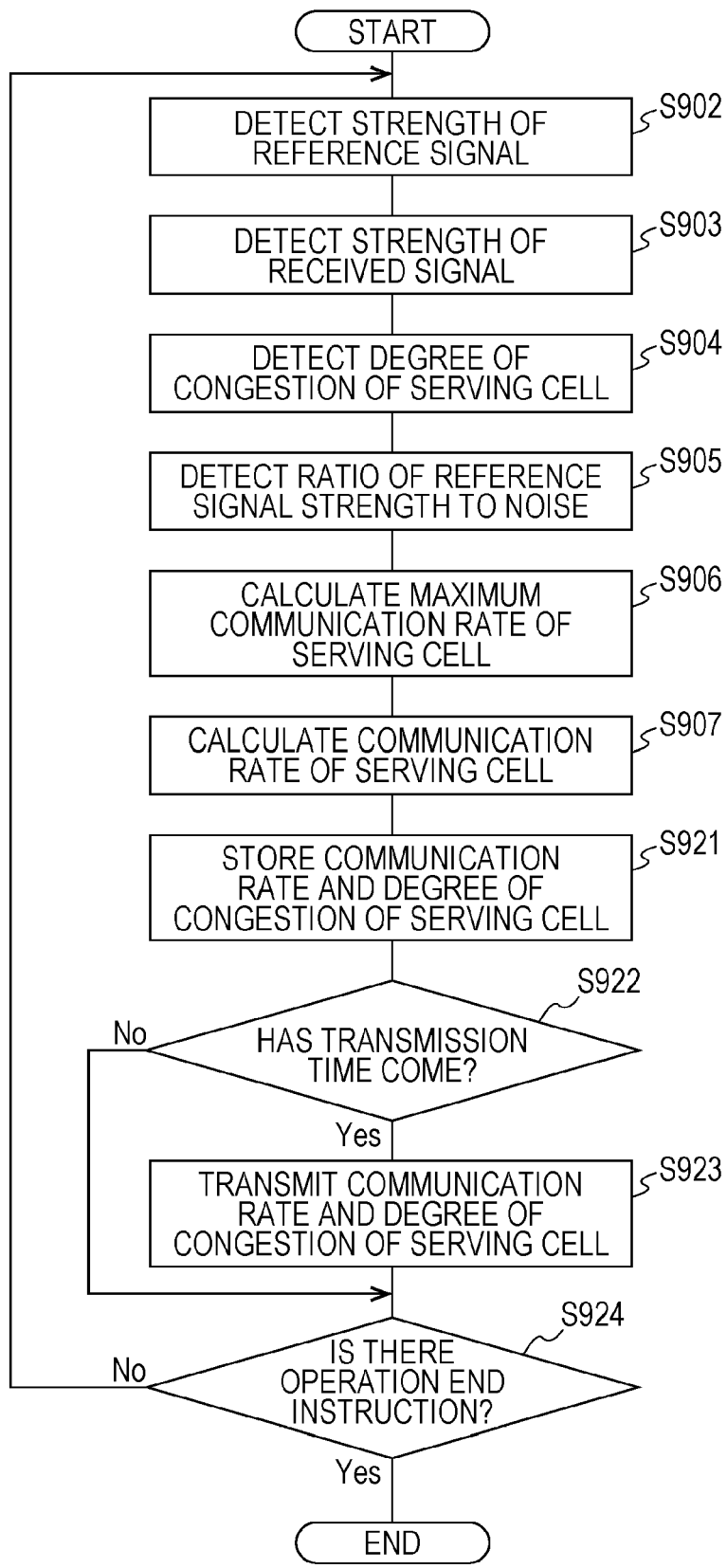
FIG. 14 is a flowchart showing an example of the procedures in an information transmitting process to be performed by the wireless communication device 400 in the third embodiment of the present technique.

FIG. 14 is a flowchart showing an example of the procedures in an information transmitting process to be performed by the wireless communication device 400 in the third embodiment of the present technique. Since FIG. 14 shows a modification of the structure shown in FIG. 8, the same components as those shown in FIG. 8 are denoted by the same reference numerals as those used in FIG. 8, and part of the explanation of them will not be repeated.

The control unit 420 associates the value of a calculated effective communication rate of the serving cell and the value of a calculated degree of congestion of the serving cell with the positional information, and stores the values associated with the positional information into the storage unit 430 (step S921). The control unit 420 then determines whether a transmission time has come (step S922), and, if a transmission time has not come yet, the control unit 420 moves on to step S924. If a transmission time has come (step S922), on the other hand, the control unit 420 transmits the respective pieces of information stored in the storage unit 430 to the information processing device 500 (step S923).

A check is then made to determine whether there is an operation end instruction (step S924). If there is not an operation end instruction, the process returns to step S902. If there is an operation end instruction, the information transmitting process is ended.

[Example of Communication Rate Calculation Using Information from an Information Processing Device]

In the above described examples, a communication rate of the serving cell is calculated by using respective pieces of information acquired by a wireless communication device. An example case where a communication rate of the serving cell is calculated by using the information managed in an information processing device is described below.

[Example Structure of a Communication System]

Figure 15:
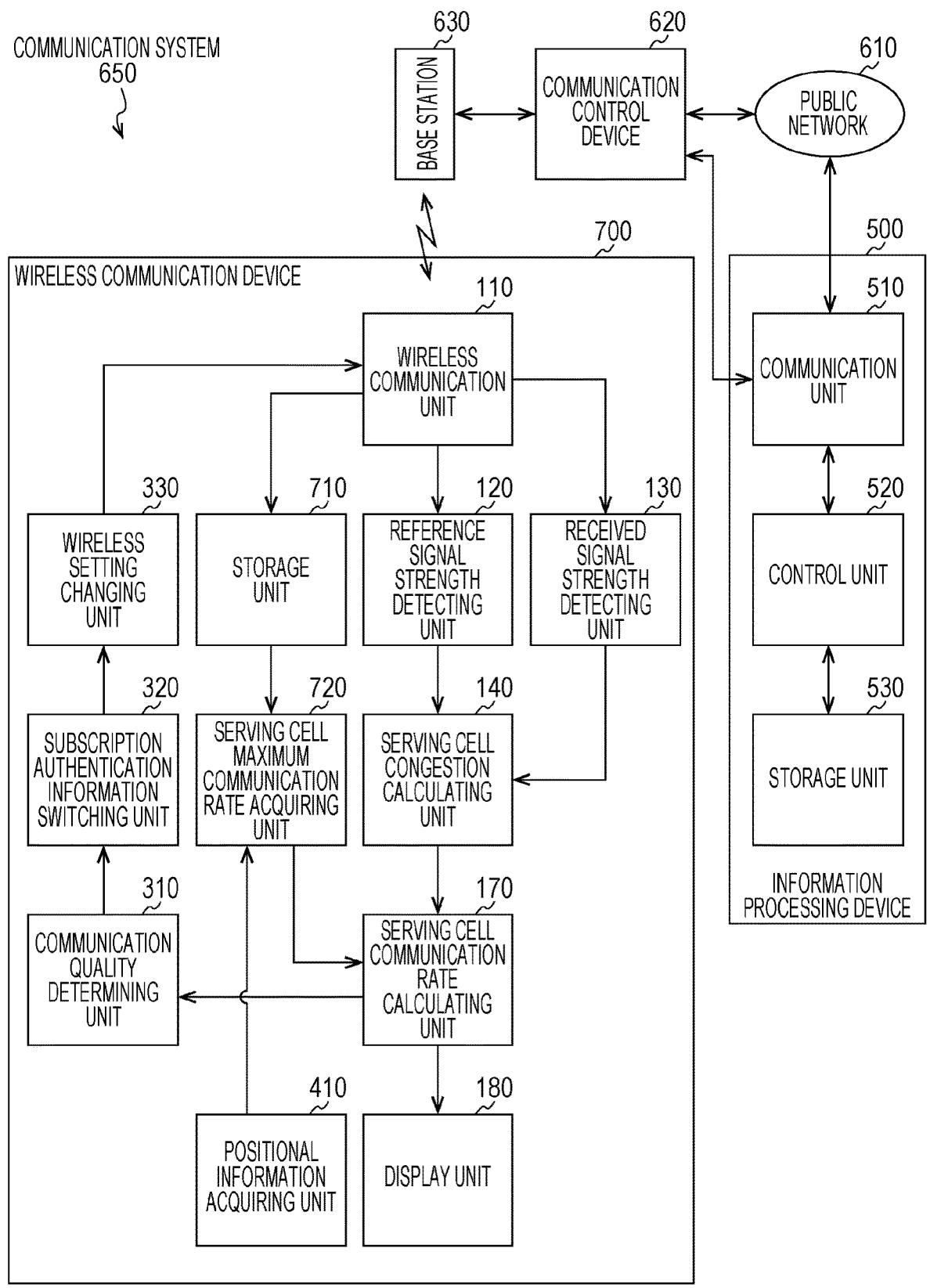
FIG. 15 is a block diagram showing an example functional structure of a communication system 650 in the third embodiment of the present technique.

FIG. 15 is a block diagram showing an example functional structure of a communication system 650 in the third embodiment of the present technique. The communication system 650 is formed by partially modifying the wireless communication device 400 in the communication system 600 shown in FIG. 11. Therefore, the same components as those of the communication system 600 are denoted by the same reference numerals as those used for the communication system 600, and part of the explanation of them will not be repeated.

A wireless communication device 700 includes a storage unit 710 and a serving cell maximum communication rate acquiring unit 720.

The wireless communication unit 110 receives information transmitted from the information processing device 500 (or the information stored in the storage unit 530) via the base station 630, and stores the received information into the storage unit 710. For example, the wireless communication unit 110 transmits an acquisition request for acquiring information about the maximum communication rate associated with the position where the wireless communication device 700 is located (the position of existence), to the information processing device 500. The wireless communication unit 110 then receives the information transmitted from the information processing device 500 in response to the acquisition request, and stores the received information into the storage unit 710. As for the information about the maximum communication rate, the information related to the maximum communication rates associated with the area including the position where the wireless communication device 700 is located is collectively received through a request, and may be stored into storage unit 710.

The serving cell maximum communication rate acquiring unit 720 extracts and acquires, from the information stored in the storage unit 710, the serving cell maximum communication rate associated with the positional information acquired by the positional information acquiring unit 410. The serving cell maximum communication rate acquiring unit 720 then outputs the acquired maximum communication rate of the serving cell to the serving cell communication rate calculating unit 170.

Using the maximum communication rate acquired from the serving cell maximum communication rate acquiring unit 720, the serving cell communication rate calculating unit 170 calculates the value of a communication rate (an effective communication rate) that is effective in the communication service being provided by the base station. That is, the serving cell communication rate calculating unit 170 calculates the value of an effective communication rate based on the value of the maximum communication rate acquired from the serving cell maximum communication rate acquiring unit 720 and the degree of congestion of the serving cell.

The communication rate display process and the subscription authentication information switching process are the same as those of the first and second embodiments of the present technique, and therefore, detailed explanation of them is not repeated herein.

As described above, according to the third embodiment of the present technique, the information related to wireless communication such as the maximum communication rate depending on the place where the wireless communication device is located can be associated with the information (positional information) related to the position where the wireless communication device is located, and can be managed and used on the side of the information processing device. The information processing device 500 also can manage and use the information about wireless communication such as maximum communication rates depending on positions acquired by wireless communication devices, with the positional information serving as arguments. In response to an acquisition request from each wireless communication device, the information processing device 500 can also provide the information about wireless communication to the wireless communication device that has transmitted the acquisition request for the information.

In recent years, various wireless systems have been developed. Also, services that are used by users vary from services requiring small capacities to services requiring large capacities. The wireless systems mounted on today's consumer electronics products are normally compatible with 3G, but, when the LTE service started, consumer electronics products compatible with LTE also started appearing on the market. Therefore, a mechanism for arbitrarily selecting a wireless access method to users' liking is now desired. Also, it is essential to develop a technique for closely following the state of each wireless channel that changes with every movement, and identifying an optimum wireless channel for a user.

In view of this, in the embodiments of the present technique, a wireless communication device in a standby state can detect degrees of congestion of base stations. With the detected degrees of congestion of base stations, an effective communication rate can be calculated, and an optimum base station can be selected. For example, a degree of congestion can be detected only with parameters that can be acquired by a predetermined wireless communication device (such as a smartphone including a particular OS (Operating System)) compatible with LTE.

In the above described embodiments of the present technique, the particular signal that is transmitted from a base station and is to be referred to at a time of base station selection is a reference signal, but the embodiments of the present technique can also be applied to other types of signals. For example, the embodiments of the present technique can also be applied to signals (such as beacon signals or pilot signals) that are transmitted from base stations to the wireless communication device to perform at least one of estimation of communication quality of the communication channel, cell selection, cell re-selection, and handover determination.

In the embodiments of the present technique, the information processing device 500 that is integrally formed has been described as an example. However, the embodiments of the present technique can also be applied to an information processing system that includes devices that form the respective components of the information processing device. The embodiments of the present technique can also be applied to mobile wireless communication devices (such as terminal devices for data communication) other than portable telephone devices, and immobile wireless communication devices (such as wireless communication devices designed for gathering data on automatic vending machines). For example, in an immobile wireless communication device, settings can be adjusted so that a communication process is performed only when calculated communication quality is high. In this manner, wireless communication resources and consumed power can be efficiently used.

In the examples described in the embodiments of the present technique, information related to calculated communication quality (communication quality information) is displayed on the display unit 180. However, communication quality information may be output from an audio output unit (such as a speaker) of a wireless communication device, for example. A voice message, "the currently-expected communication rate is xx.yy Mbps.", can be output every time a communication rate is calculated, for example. Alternatively, an electronic device (such as an external audio output device or an external display device) connected to a wireless communication device may output communication quality information. In such a case, communication quality information is transmitted from the wireless communication device to the electronic device, and is then output from the electronic device.

The above described embodiments are merely examples for carrying out the present technique, and the subject matter of the embodiments corresponds to the subject matter of the claims. Likewise, the subject matter of the claims corresponds to the subject matter with the corresponding name in the embodiments of the present technique. However, the present technique is not limited to the embodiments, and various modifications may be made to these embodiments without departing from the scope of the technique.

The processing procedures described above in the embodiments may be regarded as a method including the series of procedures, or may be regarded as a program for causing a computer to carry out the series of procedures or a storage medium storing the program. The storage medium may be a hard disk, a CD (Compact Disc), an MD (Mini-Disc), or a DVD (Digital Versatile Disk), for example. It is also possible to use a memory card, a Blu-ray Disc (a registered trade name), or the like.

The present technique may also be embodied in the structures described below.

(1)

A wireless communication device including:

a particular signal strength acquiring unit that acquires a strength of a particular signal transmitted from a base station, the particular signal being to be referred to as a time of base station selection;

a received signal strength acquiring unit that acquires a strength of a received signal transmitted in a carrier frequency band from the base station; and a congestion calculating unit that calculates a degree of congestion of the base station by using the strength of the particular signal and the strength of the received signal.

(2)

The wireless communication device of (1), further including:

a signal-to-noise ratio acquiring unit that acquires a ratio between the signal strength of the particular signal and a noise component; and a maximum communication rate calculating unit that calculates a maximum communication rate of a communication service provided by the base station.

(3)

The wireless communication device of (2), further including a communication rate calculating unit that calculates an effective communication rate by using the calculated maximum communication rate and the calculated degree of congestion of the base station, the effective communication rate being a communication rate effective in the communication service provided by the base station.

(4)

The wireless communication device of (3), further including a display unit that displays at least one of the calculated maximum communication rate, the calculated degree of congestion of the base station, and the calculated effective communication rate.

(5)

The wireless communication device of any of (2) through (4), further including:

a positional information acquiring unit that acquires positional information for identifying a position where the wireless communication device is located; and a control unit that performs control to associate at least one of the strength of the particular signal, the strength of the received signal, the ratio, the degree of congestion of the base station, and the maximum communication rate with the acquired positional information, and transmit the at least one piece of information associated with the positional information to an information processing device that manages information related to wireless communication.

(6)

The wireless communication device of any of (3) through (5), further including:

a determining unit that determines communication quality by using at least one of the strength of the particular signal, the strength of the received signal, the ratio, the degree of congestion of the base station, the maximum communication rate, and the effective communication rate; and a switch control unit that switches connection rights for the wireless communication device to connect to a base station by using wireless communication based on a result of the determination made by the determining unit.

(7)

The wireless communication device of (6), wherein the switch control unit changes at least one of settings with respect to a carrier frequency and a wireless communication method at a wireless communication unit in accordance with the connection right switching, the wireless communication unit performing wireless communication with the base station.

(8)

The wireless communication device of any of (1) through (7), wherein the particular signal is a signal transmitted from the base station to the wireless communication device to perform at least one of estimation of communication quality of a channel, cell selection, cell re-selection, and handover determination, the particular signal being one of a beacon signal, a pilot signal, and a reference signal.

(9)

An information processing device including:

an acquiring unit that acquires, from a wireless communication device, a strength of a particular signal transmitted from a base station and a strength of a received signal transmitted in a carrier frequency band from the base station, the particular signal being to be referred to at a time of base station selection; and a congestion calculating unit that calculates a degree of congestion of the base station by using the strength of the particular signal and the strength of the received signal, the wireless communication device being connected to the base station.

(10)

A communication system including:

a wireless communication device including: a congestion calculating unit that calculates a degree of congestion of a base station by using a strength of a particular signal transmitted from the base station and a strength of a received signal transmitted in a carrier frequency band from the base station, the particular signal being to be referred to at a time of base station selection; and a control unit that performs control to transmit, to an information processing device, communication quality information in which positional information for identifying a position where the wireless communication device is located is associated with at least one of the strength of the particular signal, the strength of the received signal, and the degree of congestion of the base station; and the information processing device that manages the communication quality information transmitted from the wireless communication device, and provides the communication quality information in accordance with a request from the wireless communication device.

(11)

A communication quality calculation method including:

a particular signal strength acquiring procedure to acquire a strength of a particular signal transmitted from a base station, the particular signal being to be referred to as a time of base station selection;

a received signal strength acquiring procedure to acquire a strength of a received signal transmitted in a carrier frequency band from the base station; and a congestion calculating procedure to calculate a degree of congestion of the base station by using the strength of the particular signal and the strength of the received signal.

(12)

A program for causing a computer to carry out:

a particular signal strength acquiring procedure to acquire a strength of a particular signal transmitted from a base station, the particular signal being to be referred to as a time of base station selection;

a received signal strength acquiring procedure to acquire a strength of a received signal transmitted in a carrier frequency band from the base station; and a congestion calculating procedure to calculate a degree of congestion of the base station by using the strength of the particular signal and the strength of the received signal.

REFERENCE SIGNS LIST

100 Wireless communication device
110 Wireless communication unit
120 Reference signal strength detecting unit
130 Received signal strength detecting unit
140 Serving cell congestion calculating unit
150 Reference signal-to-noise ratio detecting unit
160 Serving cell maximum communication rate calculating unit
170 Serving cell communication rate calculating unit
180 Display unit
300 Wireless communication device
310 Communication quality determining unit
320 Subscription authentication information switching unit
330 Wireless setting changing unit
400 Wireless communication device
410 Positional information acquiring unit
420 Control unit
430 Storage unit
500 Information processing device
510 Communication unit
520 Control unit
530 Storage unit
600 Communication system
610 Public network
620 Communication control device
630 Base station
650 Communication system
700 Wireless communication device
710 Storage unit
720 Serving cell maximum communication rate acquiring unit

The invention claimed is:

1. A wireless communication device comprising:
a radio transceiver; and
a programmed circuit configured to:
detect a first reference signal transmitted from a cell of a base station and measure an average strength of the detected first reference signal as Reference Signal Received Power (RSRP), the first reference signal being used for cell selection or cell reselection;
select the cell as a serving cell:
detect a second signal transmitted in a carrier frequency band from the serving cell of the base station and measure a strength of the detected second signal as Received Signal Strength Indicator (RSSI); and
calculate a degree of congestion in the serving cell of the base station by using the value of a Reference Signal Received Power (RSRP), the value of the RSSI, and number of resource blocks in the carrier frequency,
wherein the degree of congestion indicates radio of a proportion of vacant available resource blocks to all the resource blocks in the carrier frequency.

2. The wireless communication device according to claim 1, wherein the programmed circuit is:
configured to acquire a ratio between the signal strength of the particular signal and a noise component; and
configured to calculate a maximum communication rate of a communication service provided by the base station.

3. The wireless communication device according to claim 2, wherein the programmed circuit is: configured to calculate an effective communication rate by using the calculated maximum communication rate and the calculated degree of congestion of the base station, the effective communication rate being a communication rate effective in the communication service provided by the base station.

4. The wireless communication device according to claim 1, wherein the programmed unit is configured to display, on a display equipped in the wireless communication device, the degree of congestion in the serving cell of the base station.

5. The wireless communication device according to claim 3, wherein the programmed circuit is:
configured to determine communication quality by using at least one of the strength of the particular signal, the strength of the received signal, the ratio, the degree of congestion of the base station, the maximum communication rate, and the effective communication rate; and
configured to switch connection rights for the wireless communication device to connect to a base station by using wireless communication based on a result of the determination made by the determining unit.

6. The wireless communication device according to claim 5, wherein programmed circuit changes at least one of settings with respect to a carrier frequency and a wireless communication method at a wireless communication unit in accordance with the connection right switching, the wireless communication unit performing wireless communication with the base station.

7. The wireless communication device according to claim 2, wherein the programmed circuit is:
configured to acquire positional information for identifying a position where the wireless communication device is located; and
configured to perform control to associate at least one of the strength of the particular signal, the strength of the received signal, the ratio, the degree of congestion of the base station, and the maximum communication rate with the acquired positional information, and transmit the at least one piece of information associated with the positional information to an information processing device managing information related to wireless communication.

8. The wireless communication device according to claim 1, wherein the first reference signal is a signal transmitted from the base station to the wireless communication device to perform at least one of estimation of communication quality of a channel, cell selection, cell re-selection, and handover determination, the particular signal being one of a beacon signal, a pilot signal, and a reference signal.

* * * * *